US008214079B2

(12) United States Patent
Lee et al.

(10) Patent No.: US 8,214,079 B2
(45) Date of Patent: Jul. 3, 2012

(54) CENTRAL INFORMATION PROCESSING SYSTEM AND METHOD FOR SERVICE ROBOT HAVING LAYERED INFORMATION STRUCTURE ACCORDING TO RECOGNITION AND REASONING LEVEL

(75) Inventors: Suk Han Lee, Gyeonggi-do (KR); Yeon Chool Park, Seoul (KR); Joon Young Park, Gyeonggi-do (KR); Jun Hee Lee, Gyeonggi-do (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 1135 days.

(21) Appl. No.: 12/076,893

(22) Filed: Mar. 25, 2008

(65) Prior Publication Data

US 2008/0243305 A1 Oct. 2, 2008

(30) Foreign Application Priority Data

Mar. 30, 2007 (KR) .................. 10-2007-0031901
Jan. 17, 2008 (KR) .................. 10-2008-0005137

(51) Int. Cl.
*G06F 19/00* (2011.01)

(52) U.S. Cl. ..................................... 700/245

(58) Field of Classification Search .............. 700/245, 700/246, 247, 248, 249, 250, 253, 255, 258, 700/259; 318/568.1, 568.11, 568.12, 568.13, 318/568.16, 568.19
See application file for complete search history.

(56) References Cited

U.S. PATENT DOCUMENTS 5,018,219 A * 5/1991 Matsuzaki et al. ............ 382/226
7,620,477 B2 * 11/2009 Bruemmer ................... 700/245

FOREIGN PATENT DOCUMENTS

| JP | 2002-254374 | | 9/2002 |
| JP | 2005-111603 | | 4/2005 |
| JP | 2005111603 | * | 4/2005 |
| JP | 2006-113687 | | 4/2006 |
| JP | 2006-198730 | | 8/2006 |
| KR | 1020050058160 | | 6/2005 |
| KR | 1020060079092 | | 7/2006 |
| KR | 1020070071087 | | 7/2007 |
| WO | WO-2005/103848 | | 11/2005 |

OTHER PUBLICATIONS

"Intelligent Space and Human Centered Robotics", Toru Yamaguchi;vol. 50, No. 5 (pp. 881-888); Oct. 2003; 0278-0046/03 IEEE.* Toru Yamaguchi et al., "Intelligent Space and Ontology Technology", pp. 2-8E, Jun. 11, 2010.
Aika Nakajima et al., "Home Use Service Robot System by Recognizing Human's Intention of 'Pointing Movement' Based on Environmental Information" pp. 2-6E., Jun. 11, 2010.

* cited by examiner

*Primary Examiner* — James Trammell
*Assistant Examiner* — Thanh V Nguyen
(74) *Attorney, Agent, or Firm* — Rabin & Berdo, P.C.

(57) ABSTRACT

A central information processing system for a service robot. The system includes a broker unit including a plurality of interfaces for analyzing an information request from a corresponding service robot, transforming a format of the requested information, and transmitting the transformed information to the service robot, a spatial information manager for hierarchically composing and storing spatial information according to a recognition/reasoning level, searching spatial information, and returning the searched spatial information, an object information manager for hierarchically composing and storing object information about objects according to a recognition/reasoning level, searching object information, and returning the searched object information, and a space and object reasoning unit for searching and reasoning upper layer information about the object or space using lower layer information obtained from real environment or object, or searching and reasoning lower layer information to be used for comprehension of the object or space from upper layer information.

21 Claims, 22 Drawing Sheets
(13 of 22 Drawing Sheet(s) Filed in Color)

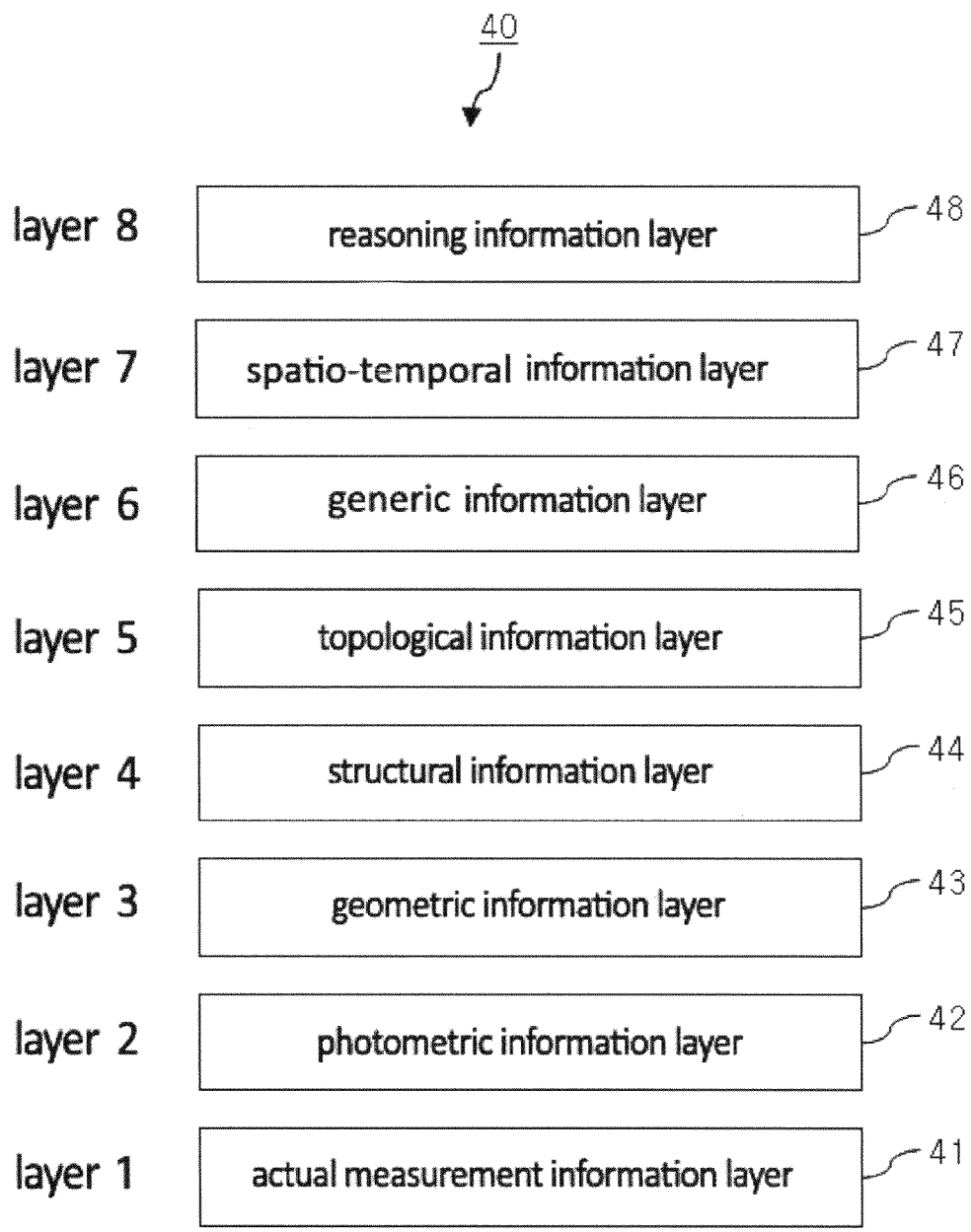

FIG. 4

| information layer | spatial information | object information |
|---|---|---|
| reasoning information layer | evidence structure for space | evidence structure for object |
| spatio-temporal information layer | environmental information | spatio-temporal context |
| generic information layer | generic spatial model | generic object model |
| topological information layer | object/obstacle location | object property |
| structural information layer | spatial configuration | object configuration |
| geometric information layer | geometric structure | geometric feature |
| photometric information layer | photometric feature | photometric feature |
| actual measurement information layer | base map | 2d/3d raw image |

FIG. 10b

```xml
<?xml version="1.0" encoding="UTF-8"?>
<!DOCTYPE X3D PUBLIC "ISO//Web3D//DTD X3D 3.0//EN"
 "http://www.web3d.org/specifications/x3d-3.0.dtd">

<X3D profile="Immersive" version="3.0">
 <head>
   <meta name="filename" content="pencil.x3d"/>
   <meta name="author" content="Copyright 2004 Pinecoast Software"/>
   <meta name="description" content="A simple pencil"/>
 </head>
 <Scene>
  <Transform>
   <NavigationInfo headlight="true"/>
   <DirectionalLight/>
   <Transform translation="0 2 0">
    <Shape>
     <Appearance>
      <Material diffuseColor="1 1 0"/>
     </Appearance>
     <Cone solid="true" side="true" bottom="true"/>
    </Shape>
   </Transform>
   <Transform rotation="0 1 1 0" translation="0 -1 0">
    <Shape>
     <Appearance>
      <Material diffuseColor="0 1 0"/>
     </Appearance>
     <Cylinder height="4" solid="true" side="true" />
    </Shape>
   </Transform>
  </Transform>
 </Scene>
</X3D>
```

(a) refrigerator  (b) air conditioner  (c) bookshelf (a) vertical line  (b) horizontal line  (c) relation between lines FIG. 23
(a) test environment
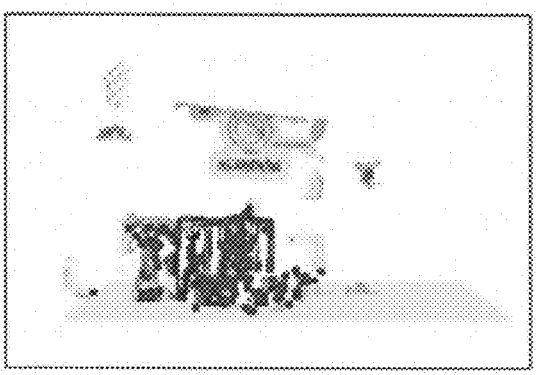
(b) particle from
SIFT based recognition
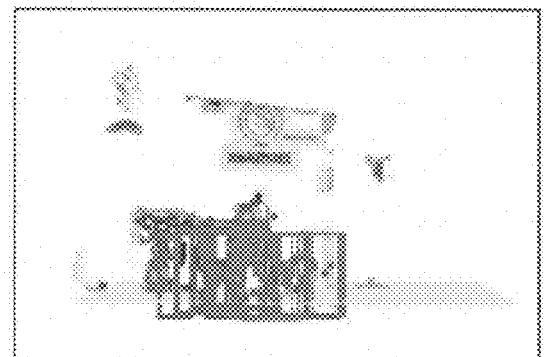
(c) particle from
line based recognition
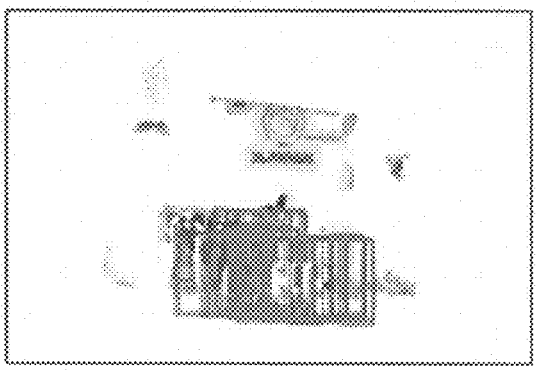
d) particle from SIFT and line
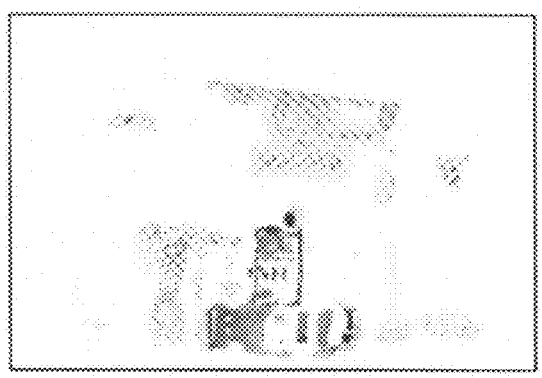
e) recognized juice (blue line)

CENTRAL INFORMATION PROCESSING SYSTEM AND METHOD FOR SERVICE ROBOT HAVING LAYERED INFORMATION STRUCTURE ACCORDING TO RECOGNITION AND REASONING LEVEL

The present application claims priority under 35 U.S.C. 119 to Korean Patent Application No. 10-2007-0031901 (filed on Mar. 30, 2007) and Korean Patent Application No. 10-2008-0005137 (filed on Jan. 17, 2008), which are hereby incorporated by reference in its entirety.

TECHNICAL FIELD

The present invention relates to central information processing system and method for hierarchically dividing and integrally managing information about an indoor space and objects therein based on a recognition/reasoning level and providing spatial and object information to mobile service robots according to a recognition/reasoning level of each robot.

BACKGROUND

In general, a mobile service robot performs various basic operations in an indoor environment. For example, the mobile service robot recognizes an object or a situation, navigates to a predetermined destination, grips a predetermined object, collects information about a predetermined object, and stores collected information in a database. The mobile service robot must have capability of performing operations requiring high level technologies such as simultaneous localization and map building (SLAM), self-modeling, and categorization. There have been many researches in progress for individually developing each of high-intelligent functions of a mobile service robot.

However, if a mobile service robot is built by simply combining such individually developed functions together, compatibility between functional modules may deteriorate because a mobile service robot may have different data formats and different memories according to each function. Also, large amount of duplicated information may be generated because each of robots has similar information respectively. It is inefficient in a view of data operability. For example, when a mobile service robot receives a mission of fetching a green tea in a refrigerator at a kitchen, the mobile service robot performs sequence of operations such as navigation, recognition, and manipulation. If green tea information for recognition is different from green tea information for manipulation, and if refrigerator information for navigation is stored separately from refrigerator information for recognition, information redundancy may occur because information is not integrally managed. If such waste continues, inefficiency continuously increases in managing memory spaces and in compatibility between functional modules. If a robot collects the same information about a refrigerator, a green tea, and a kitchen through sensing and perception although the other robot already has the same sensed or perception information of the refrigerator, the green tea, and the kitchen, the robots may waste resources due to spatial/temporal redundancy.

Also, if service robots were individually developed according to each of functions, each of the service robots has limited capability to provide low level services. For example, if a mobile service robot does not have high level reasoning information or context information for a space or an object although the mobile service robot has superior navigation capability using a high level reasoning technique such as SLAM, the mobile service robot may have low capability of learning knowledge about environments and objects and understanding relations thereof. Then, the robot cannot perform operation based on understanding about a space and an object in an indoor space. For example, the robot cannot perform an operation for fetching a green tea in a refrigerator at a kitchen, an operation for bring a cup of juice on a table at a kitchen to a master sat on sofa at a living room. In order to perform such a high level operation or service, it is necessary to have a knowledge system or structure for an object and a space in addition to capability for accurately navigating to a destination and for building a map. That is, a robot must understand a space or an object.

Furthermore, it is more necessary to share information about a space or an object with robots in an indoor space where a plurality of service robots operate together. That is, information collected by a service robot must be shared with the other service robots in the same environment and the context must be reflected to services provided by the other service robots. Particularly, if a plurality of robots having different recognition/reasoning levels are in the same environment, it is necessary to process and transform spatial and object information according to a recognition/reasoning level of each robot and to share the processed and transformed information.

Therefore, there has been a demand for developing a system for integrally managing information and sharing the information with various service robots. Related researches have been partially made, recently.

A geographic information system (GIS) is one of methods for effectively representing and managing geometric/spatial information. That is, the GIS is one of technologies for helping a user to make intelligent decision. The GIS is also a system that maps data having properties to multiple layers. In general, the GIS describes only information suitable to a purpose in detail. The general GIS data is not suitable to a service robot for performing precise operations in home environment because the GIS data is limited to an outdoor space or a ground. Also, an indoor environment has been modeled using computer aided design (CAD) many times and numerous commercial products thereof have been introduced. The indoor environment modeling has been standardized through Industrial Foundation Classes (IFC). However, the requirements of a home service robot are not satisfied by the CAD because the CAD provides only geometric building structure information.

In a web service field, many tries have been made for integrally managing information about individuals who are an object of providing a service by a home service robot. That is, the behavior patterns of individuals are observed, ontology is created based on the observation data, and new information about an individual is created through reasoning using the ontology. It is expected that such approach helps a robot to easily understand requirements of human rather than helping a robot to perform a given mission.

Information system approach for physical data or raw data has been used in fields that collect data limited to characteristics of sensors or fields that collect raw data processed in a low level. Such collected information is not suitable for a service robot because the reusability thereof is low or the collected information cannot be linked with abstract knowledge.

Among researches about human voice in a view of Human-Robot Interaction (HRI), an aurora project was made for linking raw data with high level abstract knowledge. In the aurora project, a central server stores vocabularies of human voice and is shared for analyzing preprocessed data and handling errors. However, an original purpose of distributed sound recognition is to reduce a bottleneck situation caused by lack of computational resources in a terminal.

Also, Orca was introduced as a system for sharing software components, not as a system for sharing data with robots. The object of the Orca is to effectively and continuously reuse components by simplifying general interfaces between components and making use of components easy. The Orca is realized not only through software component design but also through effective management of component repository. However, the Orca is middleware approach for binding connection of components with repositories as one framework.

Furthermore, a method for representing information about a space and objects recognized in a soccer game played with four-foot robots and storing the information was introduced. However, this method has shortcoming that robots exchange information only through task share using a token [reference 1].

Moreover, another study introduced a method for task based information generation and robot learning. Robots operating in home or offices must consider various environments and movements to perform a given mission. However, it is impossible that a robot perfectly builds knowledge about environments such as home and office in advance. Therefore, this study introduced new Teaching Framework as Task Model-Based Interactive Teaching [reference 2].

In addition, various approaches were introduced for systemizing data, information, and knowledge and grafting the systemized data, information, and knowledge to robots or automation equipment. However, it is required to newly develop an information processing system that can satisfy requirements of a service robot.

[reference 1] Farinelli, A. Iocchi, L. Nardi, D, and Ziparo, V. A. 'Assignment of dynamically perceived tasks by token passing in multirobot systems, Proceedings of the IEEE, Special issue on Multi-Robot Systems, 2006'

[reference 2] Jun Miura, Koji Iwase, and Yoshiaki Shirari 'Interactive Teaching of a Mobile Robot, In Proceeding of 2005 Int. Conf. on Robotic and Automation, pp. 3389-3394, 2005'

SUMMARY

The present invention has been proposed in order to provide central information processing system and method for integrally managing information about an indoor space and objects therein in order to enable a plurality of service robots to share the indoor information by providing necessary indoor information to the service robots and receiving modified information from the service robots.

The present invention has been also proposed in order to provide central information processing system and method for hierarchically dividing and integrally managing information about an indoor space and objects therein according to a recognition/reasoning level and providing spatial information and object information to mobile service robots according to a recognition/reasoning level of each robot.

The present invention has been also proposed in order to provide central information processing system and method for searching and reasoning information about an object or a space using recognition and reasoning information ranging from lower information layers and upper information layers and providing searching and reasoning results.

In an embodiment of the present invention, a central information processing system for a service robot, which communicates with at least one of mobile service robots in an indoor, includes a broker unit, a spatial information manager, an object information manager, and a space and object reasoning unit. The broker unit includes at least one of interfaces corresponding to the service robots. Each of the interfaces analyzes an information request from a corresponding service robot, transforms a format of the requested information to a format analyzable by the corresponding service robot, and transmits the transformed information to the service robot. The spatial information manager hierarchically composes and stores spatial information for the indoor according to a recognition/reasoning level, searches spatial information requested by a spatial information request of the broker unit, and returns the searched spatial information. The object information manager hierarchically composes and stores object information about objects in the indoor according to a recognition/reasoning level, searches object information requested by an object information request of the broker unit, and returns the searched object information. The space and object reasoning unit searches and reasons upper layer information about the object or space using lower layer information obtained from real environment or object, or searches and reasons lower layer information to be used for comprehension of the object or space from upper layer information.

In the central information processing system for a service robot according to the present invention, the spatial information or the object information may include: an actual measurement information layer including actual measurement information; a photometric information layer including photometric features; a geometric information layer including information about sub-parts obtained by dividing an object or a space by a geometric structure; a structural information layer including information obtained by dividing constituent elements of a space or an object and symbolizing and layering information about the divided constituent elements; a topological information layer including information for representing locations of objects and obstacles in a space and accessibility information for gripping an object; a generic information layer including information about generic models of a space, an object, and constituent elements of the space and the object; a spatio-temporal information layer including information about variation and relation of objects or a space according to a time and a space; and a reasoning information layer including reasoning information for reasoning about a space, an object or states of the space or the object from object or spatial information of lower information layers.

In the central information processing system for a service robot according to the present invention, the actual measurement information layer for a space may include base map information having geometric information of an indoor space. The photometric information layer for a space may include a photometric feature map of an indoor space. The geometric information layer for a space may include geometric information of sub-parts obtained by dividing an indoor space geometrically. The topological information layer for a space may include a global coordinate or a pose of an object, or information about an object recognized as an obstacle. The generic information layer for the space may include semantic information for a space or constituent elements of the space. The spatio-temporal information layer for a space may include a brightness of light, a direction of lighting, a temperature, and a humidity, which vary according to a temporal and spatial state of an indoor.

In the central information processing system for a service robot according to the present invention, the actual measurement information layer for an object may include information of 2D/3D raw information that stores 2D or 3D representation data obtained by actually measuring an object. The topological information layer for an object may include information about accessible directions represented by a plurality of 3D contact points and 3D directional vectors. The spatio-temporal information layer for an object may include information about an object-space temporal dependency, an object presence and spatiotemporal dependency, an object-object spatiotemporal dependency relation, an object-function spatiotemporal dependency, and an object-physical feature spatiotemporal dependency. The reasoning information layer for an object may include information about an evidence structure formed as a graph representing relation between information of lower information layers as a probability.

In the central information processing system for a service robot according to the present invention, the photometric feature may include information such as Scale Invariant Feature Transform (SIFT), Harris Corner, color, and line.

In the central information processing system for a service robot according to the present invention, the obstacle information may include information represented as mesh or cell.

In the central information processing system for a service robot according to the present invention, the 2D or 3D representation data may include at least one of: a 2D raw image calculated through at least two of camera angles; depth data obtained from one of a laser scanner, a stereo camera, a structured light camera; and mesh data generated from the depth data.

In the central information processing system for a service robot according to the present invention, the spatial information manager or the object information manager may compose and store the spatial information or the object information in ontology, and the space and object reasoning unit may perform reasoning based on ontology.

In the central information processing system for a service robot according to the present invention, the interface may compose a united map by combining information about a base map of the actual measurement information layer for a space and object/obstacle location information of the topological information layer and provide the united map to the service robots, if the corresponding service robot requests a map.

In the central information processing system for a service robot according to the present invention, the central information processing system may further include a mission analysis manager for composing a probability based behavior structure based on a given mission, which decides unit behaviors to perform by a robot, and storing the composed probability based behavior structure, returning the probability based behavior structure in response to a request from the broker unit or extracting unit behavior to perform and necessary information by analyzing the given mission and returning the extracted unit behavior and the extracted necessary information.

In the central information processing system for a service robot according to the present invention, the mission analysis manager may compose the behavior structure in a Bayesian network having a probabilistic precedence relation of perception data, an evidence structure and behaviors, and decide an optimal path based on a probability of the precedence relation and extract behaviors on the selected path as unit behaviors to perform.

Further, in another embodiment of the present invention, a method for processing information for service robots using a central information processing system communicating with at least one of mobile service robots in an indoor, including the steps of: a) hierarchically composing and storing spatial information and object information for the indoor according to a recognition/reasoning level; b) composing interface for each service robot for analyzing an information request of the service robots, transforming a format of the requested information to a format analyzable by the service robot, and transmitting the transformed information to the robots; c) receiving an information searching request for searching a spatial information or an object information from the robots; e) determining whether reasoning is required for searching information or not, and searching and reasoning upper layer information about the object or space using lower layer information obtained from real environment or object, or searching and reasoning lower layer information to be used for comprehension of the object or space from upper layer information; f) searching requested object information or requested spatial information; and g) transmitting searched spatial information or searched object information to the requesting robot.

In the central information processing method for service robots according to the present invention, the spatial information or the object information may include: an actual measurement information layer including actual measurement information; a photometric information layer including photometric features; a geometric information layer including information about sub-parts obtained by dividing an object or a space by a geometric structure; a structural information layer including information obtained by dividing constituent elements of a space or an object and symbolizing and layering information about the divided constituent elements; a topological information layer including information for representing locations of objects or obstacles in a space; a generic information layer including information about generic models of a space, an object, or constituent elements of the space or the object; a spatio-temporal information layer including information about variation and relation of objects or a space according to a time and a space; and a reasoning information layer including reasoning information for reasoning about a space, an object or states of the space or the object from object or spatial information of lower information layers.

In the central information processing method for service robots according to the present invention, the actual measurement information layer for a space may include base map information having geometric information of an indoor space. The photometric information layer for a space may include a photometric feature map of an indoor space. The geometric information layer for a space may include geometric information of sub-parts obtained by dividing an indoor space geometrically. The topological information layer for a space may include a global coordinate or a pose of an object, or information about an object recognized as an obstacle. The generic information layer for a space may include semantic information for the space or constituent elements of the space. The spatio-temporal information layer for a space may include a brightness of light, a direction of lighting, a temperature, and a humidity, which vary according to a temporal and spatial state of an indoor.

In the central information processing method for service robots according to the present invention, the actual measurement information layer for an object may include information of 2D/3D raw information that stores 2D or 3D representation data obtained by actually measuring an object. The topological information layer for an object may include information about accessible directions represented by a plurality of 3D contact points and 3D directional vectors. The spatio-temporal information layer for an object may include information about an object-space temporal dependency, an object presence and spatiotemporal dependency, an object-object spatiotemporal dependency, an object-function spatiotemporal dependency, and an object-physical feature spatiotemporal dependency. The reasoning information layer for an object may include information about an evidence structure formed as a graph representing relation between information of lower information layers as a probability.

In the central information processing method for service robots according to the present invention, the photometric feature may include information such as Scale Invariant Feature Transform (SIFT), Harris Corner, color, and line.

In the central information processing method for service robots according to the present invention, the obstacle information may include information about obstacles represented as mesh or cell.

In the central information processing method for service robots according to the present invention, the 2D or 3D representation data may include at least one of: a 2D raw image calculated through at least two of camera angles; depth data obtained from one of a laser scanner, a stereo camera and a structured light camera; and mesh data generated from the depth data.

In the central information processing method for service robots according to the present invention, in the step a), the spatial information or the object information may be composed and stored in ontology. In the step e), reasoning may be performed based on ontology.

In the central information processing method for service robots according to the present invention, in the step g), if requested information includes information about a base map of the actual measurement information layer for a space and object/obstacle location information of the topological information layer, a united map may be composed by combining the information about the base map and the object/obstacle location information.

In the central information processing method for service robots according to the present invention, the method may further include the steps of: a0) composing a probability based behavior structure based on a given mission, which decides unit behaviors to perform by a robot, and storing the composed probability based behavior structure before the step a); and d) returning the behavior structure in response to a searching request of the robot or extracting unit behaviors to perform and necessary information to perform the unit behavior by analyzing the given mission and returning the extracted unit behaviors and the extracted necessary information after the step c).

In the central information processing method for service robots according to the present invention, in the step a0), the behavior structure may be composed in a Bayesian network having a probabilistic precedence relation of perception data, an evidence structure and behaviors. In the step d), an optimal path may be decided based on a probability of the precedence relation and behaviors on the selected path are extracted as unit behaviors to perform.

In still another embodiment, a computer readable recording medium stores the method for processing information for service robots using a central information processing system communicating with at least one of mobile service robots in an indoor according to the another embodiment.

DRAWINGS

The patent or application file contains at least one drawing executed in color. Copies of this patent or patent application publication with color drawing(s) will be provided by the Office upon request and payment of the necessary fee.

FIG. 3 is a diagram illustrating an information structure of a central information processing system in accordance with an embodiment of the present invention.

FIG. 4 is a diagram illustrating information layers of a space and an object in accordance with an embodiment of the present invention.

FIG. 10b is a diagram illustrating x3d modeling codes of FIG. 10a.

FIG. 23 is a diagram illustrating steps of recognizing a space or an object in a simulation according to an embodiment of the present invention.

DESCRIPTION

Hereinafter, embodiments of the present invention will be described in detail with reference to the accompanying drawings.

Throughout the specification, like numeral references denote like elements, and descriptions thereof are omitted.

Figure 1:
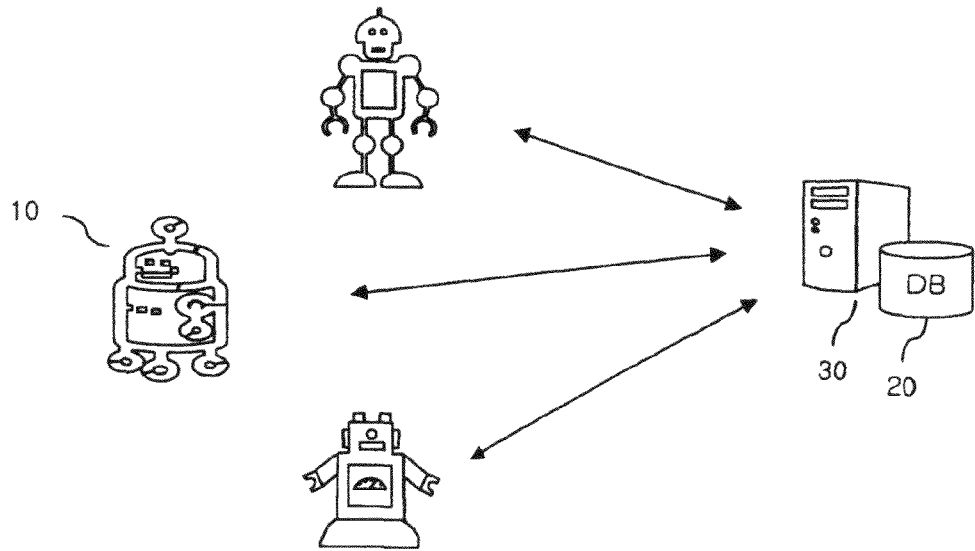
FIG. 1 is a diagram illustrating an overall system for performing central information processing system and method of a service robot in accordance with an embodiment of the present invention.

FIG. 1 is a diagram illustrating an overall system for performing central information processing system and method of a service robot in accordance with an embodiment of the present invention.

As shown in FIG. 1, the central information processing system 30 according to the present invention includes a database 20. The central information processing system 30 transmits and receives information through communicating with a plurality of mobile service robots 10.

The information processing system 30 exchanges information with the mobile service robots 10 through wireless communication. The wireless communication can be made through any wireless communication protocols such as wireless LAN, radio frequency, and Bluetooth. However, the wireless communication protocols must be capable of covering an indoor space. For example, IrDA may not be suitable for the information processing system 30 because the coverage thereof is small. If a building is huge or the coverage of an employed wireless communication protocol is small, repeaters may be disposed at predetermined locations in an indoor space. Also, it is possible to employ ultra wide band wireless communication protocols such as Wibro, HSDPA, WiFi, and Wimax. Since the above described wireless communication protocols are well known to those skilled in the art, detailed description thereof is omitted.

The database 20 may be a general relational database. Also, the database 20 may be ontology storage if object/spatial information is composed as ontology. That is, the database 20 is a well-known database having a proper structure according to a format of data of the present invention. The database 20 may employ a well-known search engine for managing and searching the database 20. For example, the database 20 may be an ontology storage including middleware such as an engine for reasoning ontology.

The mobile service robot 10 is an intelligent service robot that is movable in an indoor space and performs given missions. The robot includes sensors such as an ultra sonic sensor, an infrared sensor, a laser sensor, a general camera, a laser scanner, a stereo camera, microphones, etc. The robot 10 includes functions for recognizing an object or own position or reasoning operation by analyzing measured values and images from the sensors. Also, the mobile service robot 10 performs recognition, navigation, manipulation, and autonomous object/environment modeling. Furthermore the mobile service robot 10 includes semantic information about spaces, objects, or relation between a space and an object and performs semantic reasoning based on the semantic information. That is, the mobile service robots 10 may have different recognition/reasoning level.

The mobile service robot 10 requests necessary information to the central information processing system 30 through communication and receives the requested information therefrom. Here, the mobile servicer robot 10 may simply request data stored in the central information processing system 30 or may receive data processed in the central information processing system 30. Furthermore, the robot 10 requests desired data to the central information processing system 30 and the central information processing system 30 analyzes the request, searches and provides suitable data according to the received request. Information updated by a manager of the central information processing system or by the robot is provided to the other robots again through the central information processing system 30.

Figure 2:
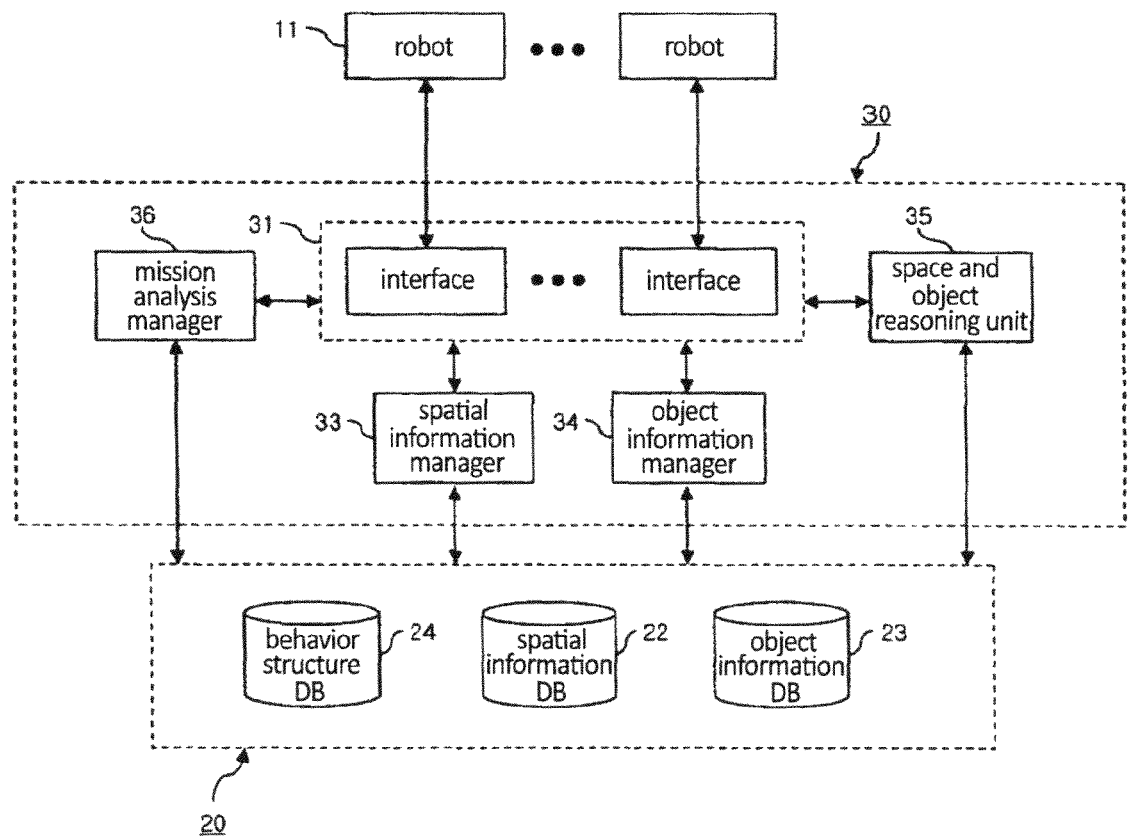
FIG. 2 is a block diagram illustrating a central information processing system for a service robot in accordance with an embodiment of the present invention.

FIG. 2 is a block diagram illustrating a central information processing system for a service robot in accordance with an embodiment of the present invention.

As shown in FIG. 2, the central information processing system 30 according to the present embodiment includes a database 20, a broker unit 31, a spatial information manager 33, an object information manager 34, and a space and object reasoning unit 35. In addition, the central information processing system 30 according to the present embodiment further includes a mission analysis manager 36.

The broker unit 31 includes at least one of interfaces 32 corresponding to each of the service robots 10. Each of the interfaces 32 analyzes an information request of a corresponding robot, transforms a format of the requested information to a predetermined robot-readable format, and transmits the transformed information to the robot.

That is, the broker unit 31 includes interfaces 32 corresponding to the service robots 10 in a one to one manner. For the same type of service robots, one interface 32 is connected and processes data in another embodiment of the present invention. In this case, the interface 32 may be configured to have a multiprocessing function for performing a plurality of operations simultaneously.

The interface 32 analyzes an information request from a corresponding service robot 10 and transforms a format of the received information request to a predetermined format that can be processed in the central information processing system 30. On the contrary, the interface 32 receives a result of the information request from the central information processing system 30 and transforms a format of the result to a predetermined format analyzable by the service robot. That is, the interface 32 transforms information to be compatible with the service robots 10 and the central information processing system 30 although the service robots 10 have different information system from that of the central information processing system 30. In near future, robots will become produced as a common tool in a daily life of human, and various manufacturers will produce intelligent service robots with different specifications. A user may purchase various types of service robots and use them in the same indoor space. Therefore, the interface 32 makes such various types of service robots 10 exchange information with the central information processing system 30.

The spatial information manager 33 and the object information manager 34 hierarchically compose information about an indoor space and objects therein according to a recognition/reasoning level and stores the layered information. A structure of information layered according to a recognition and reasoning level will be described with reference to FIG. 3. FIG. 3 is a diagram illustrating an information structure of a central information processing system in accordance with an embodiment of the present invention.

In the present embodiment, the central information processing system 30 includes information layers 40 shown in FIG. 3. The information layers 40 includes an actual measurement information layer 41, a photometric information layer 42, a geometric information layer 43, a structural information layer 44, a topological information layer 45, a generic information layer 46, a spatio-temporal information layer 47 and a reasoning information layer 48. The information layers 40 according to the present embodiment is information layered according to a recognition/reasoning level of a robot. That is, lower information layers are information obtained by roughly recognizing or reasoning a space or an object using sensors. Upper information layers are semantic information about a space or an object, which can be used to high level reasoning.

The actual measurement information layer 41 is an information layer storing actually measured information. That is, the actual measurement information layer 41 is information about a size and a shape of a measured object. The actual measurement information for a space operates as a base map such as a building plan and includes measurements of 3D shapes or measured sizes. The actual measurement information for an object is 2D/3D images of an object or intrinsic/extrinsic camera parameters. The camera parameters include a location of a camera and a lens size and are used for error calibration.

The photometric information layer 42 is an information layer storing photometric features. The photometric information is a set of predetermined value or geometry obtained by mathematically analyzing photometric data such as luminance, hue & saturation, and texture of 2D/3D points in an image. Since a robot recognizes objects appeared by lighting through cameras basically, the photometric feature is very important to recognize an object. For example, the photometric feature includes information such as color, Scale Invariant Feature Transform (SIFT), Harris Corner, and line.

The geometric information layer 43 is an information layer for storing information of sub-parts obtained by dividing a space or an object by geometric structures. Although the geometric information means information that geometrically represents a shape of an object, the geometric information also includes information about sub-parts that are obtained by structurally dividing an object or a space. For example, if a cup with a handle is recognized using a camera, the handle can be structurally separated from the cup although the handle is a part of a cup image. In case of a refrigerator, an upper door, a lower door, a freezing compartment, a cool chamber, a drawer, and a handle are structurally dividable parts. In case of a space, a window, a door, a ceiling, a column, and a corner are structurally dividable parts.

The structural information layer 44 is an information layer that divides a space or an object into constituent elements and symbolically and hierarchically stores the constituent elements. The structural information is symbolic and hierarchical information for constituent elements of an object. One building includes a plurality of floors, and each floor includes rooms and hallways. Each object includes constituent elements thereof. On the contrary, a room belongs to a floor. A floor belongs to a building. That is, the structural information is also information about spatial relations of objects, which are described in a view of an object. The structural information must be managed to be related to the geometric sub-parts in the lower layer thereof. Although the geometric sub-parts in the lower layer are divided based on exterior features, constitution of an object is divided by a function in the structural information layer 44. Since an object is divided based on geometric segments when the object is divided into constituent elements, a robot can advantageously identify an object by stages. That is, a robot can identify a door, one of constituent elements for a space, as a rectangular plate which is a geometric sub-part. It is possible to inverse recognition. For example, constituent elements of a specific apartment is divided by a functional feature linked with information in lower information layers, such as a living room, a bedroom, a kitchen, and a bath room, and the divided constituent elements are symbolically represented. For example, a refrigerator is hierarchically divided into an upper door, a lower door, a freezing compartment, a cool chamber, a drawer, and a handle, and the divided sub-parts are symbolically represented.

The topological information layer 45 is an information layer for storing information that represents a location of an object or a location of an obstacle in a predetermined space. The topological information is information that represents a global location and a pose of an object and a location and a volume of an obstacle in a predetermined space. The topological information is also information representing accessibility for gripping an object. For example, if a kitchen includes a refrigerator, an electric range, a dish washer, a cup, a dish, and a spoon, the topological information of the objects are global locations and poses of the objects in the kitchen. The obstacle information is information representing unknown objects, and it is represented as mesh or cell.

The generic information layer 46 is an information layer that defines generic models of a space, an object, or constituent elements of the space and the object and stores the defined general function. The generic model is a model that represents semantic definitions of functions, sub-parts and geometry of a space or an object, and relations therebetween. For example, the function of a door, a constituent element of a space, is information about a function of a door, which is "a path for entering to or exiting from a predetermined space" or "can open and shut". Also, a cup is that "a tool for drinking water". A handle of a cup is that "a constituent element used for lifting a cup up" and "a constituent element for gripping a cup". Like the geometric information layer 43, the sub-parts are constituent elements of a refrigerator, which are an upper door, a lower door, a freezing compartment, a cool chamber, a drawer, and a handle. Also, the sub-parts are constituent elements of a space, which are a window, a door, a ceiling, a column, and a corner. The sub-parts in the generic information layer 46 are different from the geometric information layer 43 as follows. The sub-parts in the geometric information layer 43 are information obtained by dividing instances based on actually measured data. On the contrary, the sub-parts in the generic information layer 46 define commonly dividable features of an object or a space. The geometry means a point, a line, a plane, an oval, a sphere, a box, etc., and geometric features that a space or an object is generally supposed to have are defined in the geometry. In a space, an apartment is divided into general constituent elements such as a living room, a bed room, a kitchen, and a bath room and semantically classified in the generic information layer. Lower information layers of the generic information layer 46 are information about an exterior structure or a configuration of a specific object. On the contrary, upper information layers including the generic information layer 46 are information about semantic information. That is, while classification of configuration in the lower layers is exterior classification according to a function, the generic information layer 46 is about semantic information about configuration.

The spatio-temporal information layer 47 is an information layer for storing information about object variation and space variation according to temporal and spatial change and relations thereof. The spatio-temporal information is semantic information for relation between entities. In other view points, the spatio-temporal information is semantic information about entity variation according to change of corresponding entity. The entity may be a time, an environment, the other entity, etc. That is, the spatio-temporal information denotes temporal relation (or entity variation in a time domain), environmental relation (or entity variation according to environmental variation), and relation with other entity (or entity variation according to variation of the other entity). The spatio-temporal information is information about characteristics of an indoor space or an object change according to temporal and spatial states. For example, the spatio-temporal information includes luminance, a direction of lighting, a temperature, a humidity, etc. Also, the spatio-temporal information is information about change of an object location in a time domain and information about influence of a specific object on the other objects, when the object exists in a specific time and space.

The reasoning information layer 48 is an information layer for storing reasoning information for reasoning a space, objects, or states of the space or the objects from actually measured states. The reasoning information is information about a reasoning structure that is composed using information in lower information layers. For example, the reasoning information may be an evidence structure composed as a graph based on a probability for recognizing an object. It is possible to perform reasoning at lower information layers of the reasoning information layer 48. For example, since the generic information layer and the spatio-temporal information layer are semantic information, it is possible to perform semantic reasoning. Further, it is also possible to perform reasoning for information about exterior structures in lower information layers of the generic information layer and the spatio-temporal information layer using methods for searching objects matched with specific properties or specific features. Since the reasoning information layer 48 is information for reasoning more technically based on a probability, the reasoning made in the reasoning information layer 48 is different from that made in the lower information layers thereof.

In overall, the upper information layers are composed based on the lower information layers. Although each of the information layers may be embodied individually, entire or a part of the information layers may be embodied as one data structure. For example, information about all of layers may be composed in ontology. For example, a class or an instance of a "cup" is created, all properties are defined from the actual measurement information layer to the topological information layer, and information in the generic information layer may be defined as properties of the class.

Hereinafter, the information layers will be described in detail with the spatial information manager 33 and the object information manager 34.

The spatial information manager 33 hierarchically composes spatial information about a predetermined indoor space according to a recognition/reasoning level and stores the composed spatial information. The spatial information manager 33 also searches spatial information requested by the broker unit and returns the searched result to the broker unit. As shown in FIG. 4, the spatial information is composed of information about eight information layers as described above.

Figure 5A:
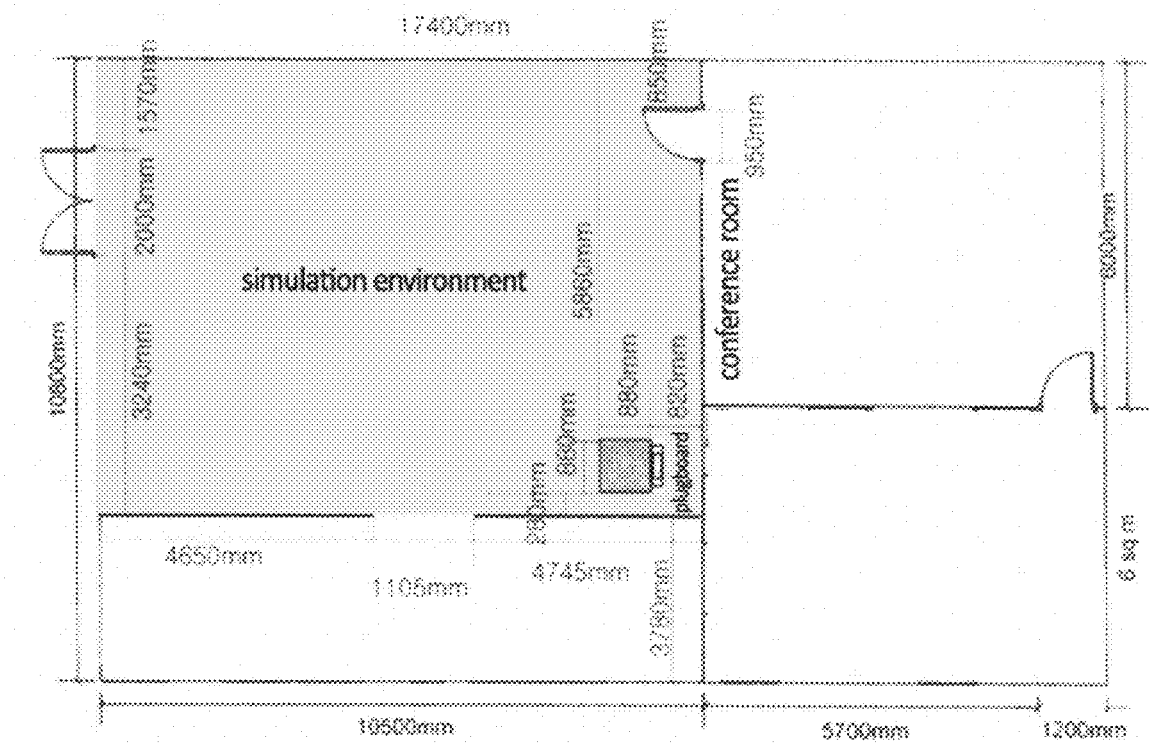
FIG. 5a and FIG. 5b are diagrams illustrating an actual map and a base map in accordance with an embodiment of the present invention.
Figure 5B:
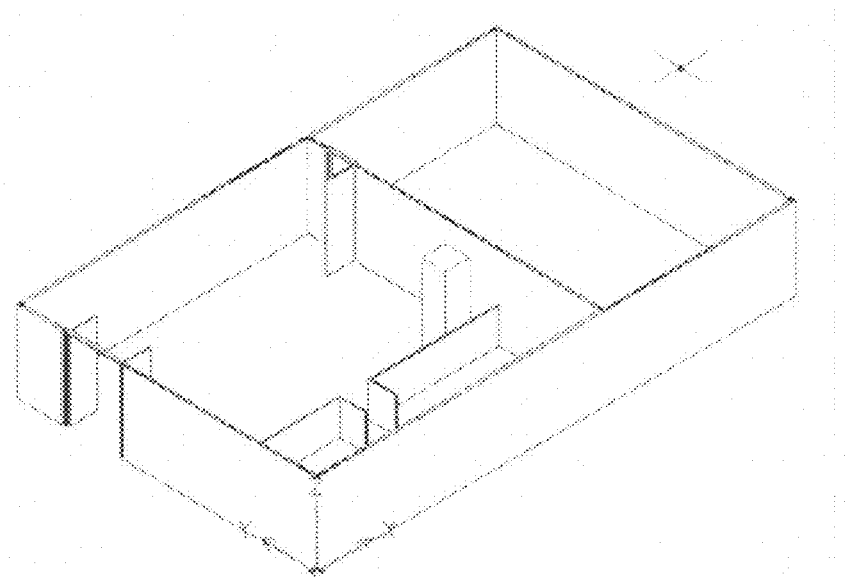

The actual measurement information layer for a space is a layer for storing geometric information of an indoor space like the geographic information system (GIS). That is, the actual measurement information layer is the most basic information such as a base map like a building plan. The base map includes a 2D grid map schematically showing structural information of a predetermined indoor environment and a 3D map composed in a CAD format according to industrial foundation class (IFC) 2xx specification, which is a basic building plan composing rule and an international standard format for exchange of document for building design. Here, the CAD format includes ifcXML and dxf. FIG. 5a is an actual map, and FIG. 5b is a base map composed based on the actual map of FIG. 5a. As shown in FIGS. 5a and 5b, the base map include basic environmental information. The reference coordinate of the base map uses an X-Y orthogonal coordinate for a horizontal plane and a Z-axis for vertical component.

Figure 6A:
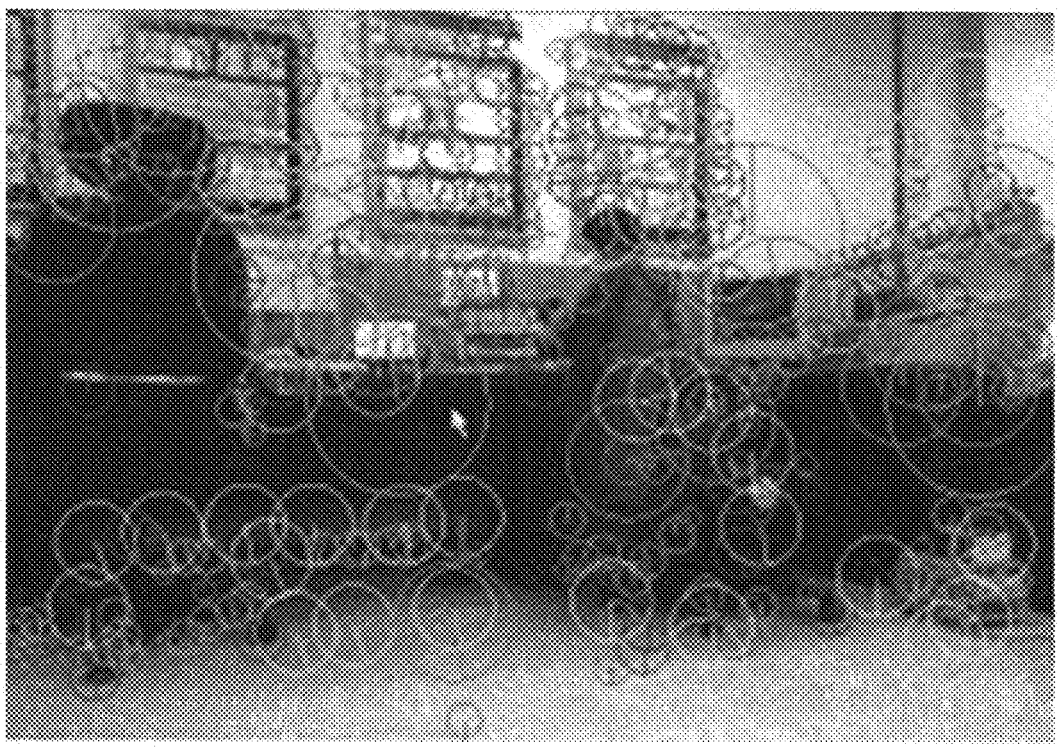
FIG. 6a is a diagram illustrating a photometric feature (SIFT) extracted from a space in accordance with an embodiment of the present invention.
Figure 6B:
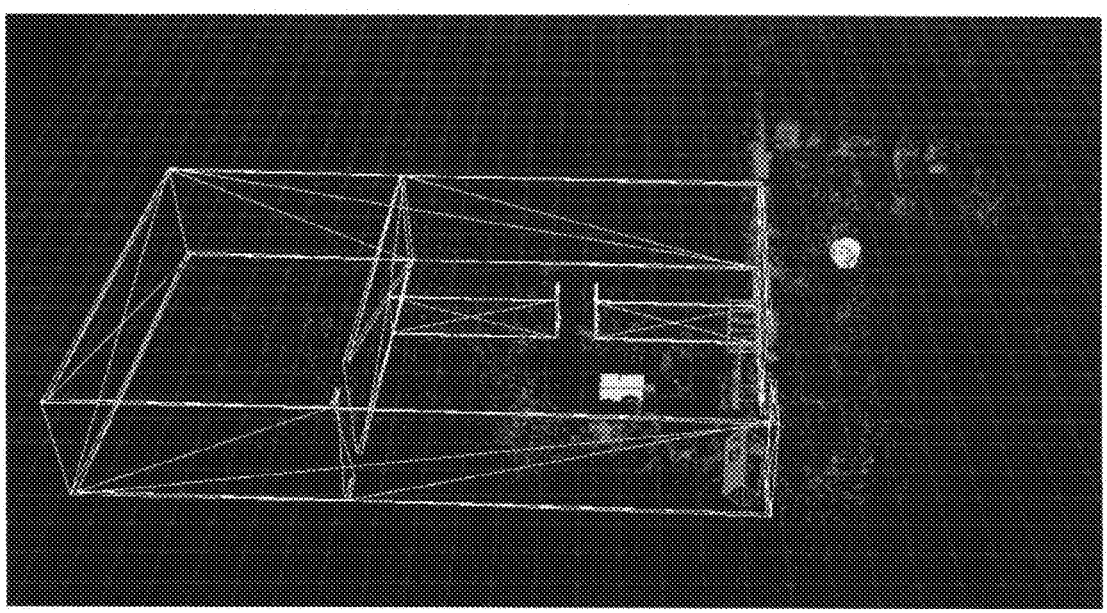
FIG. 6b is a diagram illustrating a photometric feature (SIFT) of a space information in a 3D map in accordance with an embodiment of the present invention

The photometric information layer for a space stores a photometric feature map for an indoor space. The photometric feature map represents an image processing result that can be obtained using only luminance values and color values from an entire image area, such as SIFT, Harris Corner, and Color. FIG. 6a is a diagram illustrating SIFT extracted from an indoor environment in accordance with an embodiment of the present invention, and FIG. 6b is a diagram illustrating SIFT extracted from an indoor environment in a 3D united map in accordance with an embodiment of the present invention.

The geometric information layer for a space stores a geometric environment structure. That is, an indoor environment is divided into sub-parts, and information about the sub-parts is stored in the geometric information layer. For example, environmental objects such as a door, a window, a wall, and a column, and a global geometric feature such as a corner, a side, and a plane belong to information stored in the geometric information layer for a space. Also, the structural relations of them are also stored in the geometric information layer. A robot 10 uses the information to recognize its location or to manipulate an environmental object such as opening and closing a door.

The structural information layer for a space classifies constituent elements of a space and symbolically and hierarchically stores information of the classified constituent elements. Since a building includes a plurality of floors and a floor includes pathways and rooms, the structural information symbolically represents each of the constituent elements. And, the structural information is stored to be linked with the lower information layers that store the geometric/photometric feature/actual measurement information. For example, the structural information of a specific apartment is information symbolically representing constituent elements of geometric/photometric feature/actual measurements which are divided by a functional feature such as a living room, a bed room, a kitchen, and a bath room.

Figure 7A:
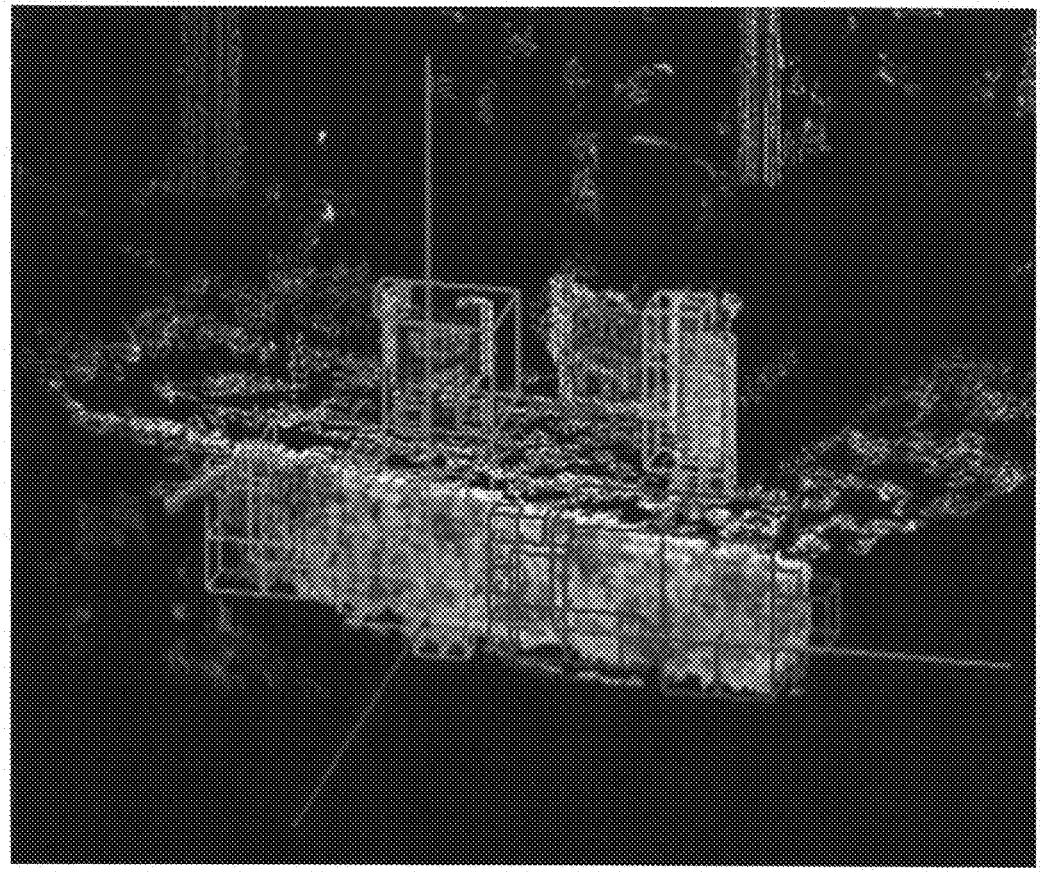
FIG. 7a is a diagram exemplary illustrating obstacles in Octree that is a cell based representation method in accordance with an embodiment of the present invention.
Figure 7B:
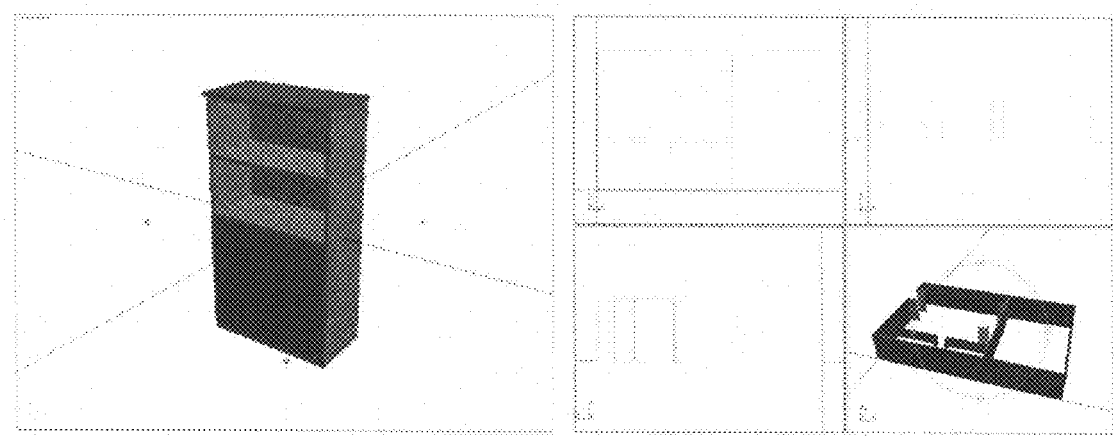
FIG. 7b is a diagram illustrating an indoor space and objects in accordance with an embodiment of the present invention.

The topological information layer for a space is an information layer for storing information about locations of an object and an obstacle. The topological information layer represents locations and poses of movable objects which are used for manipulating on a map. In the topological information layer, global coordinates and poses of objects are represented without an object model stored. In the topological information layer, an unknown object is considered as an obstacle. If a predetermined object does not have any information in object DB, the predetermined object is considered as an unknown object. The obstacle is represented and stored as mesh or cell (eg. Octree). FIG. 7a is a diagram exemplary illustrating obstacles in Octree that is a cell based representation method in accordance with an embodiment of the present invention. FIG. 7b is a diagram illustrating an indoor space and objects in accordance with an embodiment of the present invention. In an object modeling reference frame, an origin denotes the center of a target object for providing a service, an X-axis denotes horizontal components, a Y-axis denotes vertical components, and a Z-axis denotes depth component. Coordinates of objects, which are stored and managed in the spatial information manager 33, moves the object modeling reference frame to the lowest point in a height direction. That is, the spatial information manager 33 provides instinctive arrangements and coordinates movements for the object. Orientation information of objects stored and managed in the spatial information manager 33 is represented as unit vectors for world coordinates X, Y, and Z based on each of reference axis of an object, U, V, and W, or a rotation angle.

Figure 9:
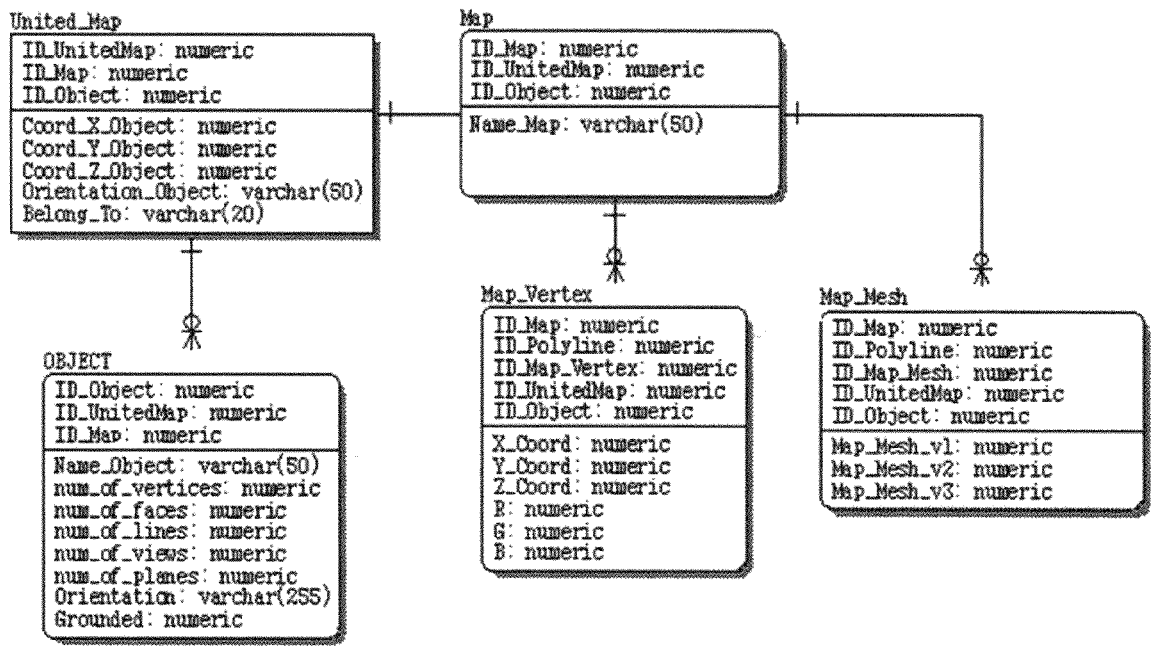
FIG. 9 shows an ER table of a united map in accordance with an embodiment of the present invention.

The interface 32 creates a united map by combining information about a base map and locations of objects and obstacles if a corresponding robot requests a map. FIG. 9 shows an ER table of a united map in accordance with an embodiment of the present invention.

The generic information layer for a space stores generic spatial models. The generic spatial models represent semantic spaces such as a living room, a bed room, a family room, and a bath room. The generic information layer also represents semantic information of constituent elements of a space such as a door, a window, etc. The generic information is used to detect a location of a robot 10 and divide areas semantically.

The spatio-temporal information layer for a space stores environmental information. The environmental information means properties varying according to temporal or spatial states, such as luminance of light, a direction of lighting including natural lighting, a temperature, and a humidity. The environmental information is a factor influencing a robot 10 to perform recognition or modeling services.

Figure 8:
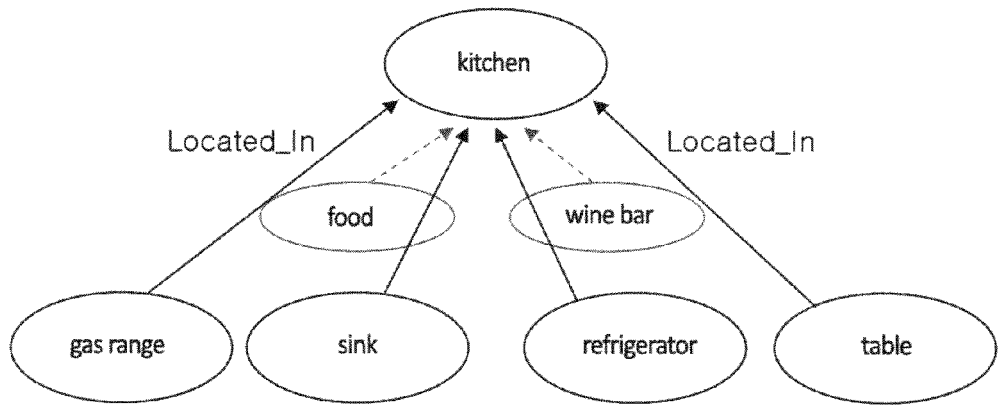
FIG. 8 is a diagram illustrating an evidence structure in a reasoning information layer for a space in accordance with an embodiment of the present invention.

The reasoning information layer for a space stores information for an evidence structure of the reasoning information layer 48 as described above. FIG. 8 is a diagram illustrating an evidence structure in a reasoning information layer for a space in accordance with an embodiment of the present invention. As shown in FIG. 8, general functions of a kitchen are cooking, conversation, and a wine bar. The kitchen generally includes a gas range, a sink, a refrigerator, and a table. A probability that a predetermined space is a kitchen become close to 1 if all of related conditions are satisfied. If predetermined number of related conditions is satisfied, it is possible to assume the predetermined space as a kitchen. Such information is stored as the evidence structure for a space.

The object information manager 34 hierarchically composes object information of objects in the indoor space according to a recognition/reasoning level and stores the hierarchical object information. The object information manager 34 receives a request for object information from the broker unit, searches the requested object information, and returns the searched object information to the broker unit. As shown in FIG. 4, the object information is composed in total of eight information layers and stored.

The actual measurement information layer for an object is information about a raw image. The actual measurement information layer stores actually-measured 2D/3D raw data of an object, which is obtained through 2D/3D camera. That is, the actual measurement information is 2D data calculated through various camera angles and includes raw images and depth data from a laser scanner, a stereo camera, or a structured light camera.

The photometric information layer for an object is information about photometric features of an object. The photometric information layer includes information such as color, scale invariant feature transform (SIFT), Harris corner, line, etc., which are obtained from the raw image. The photometric information is used as an evidence for object recognition.

Figure 11:
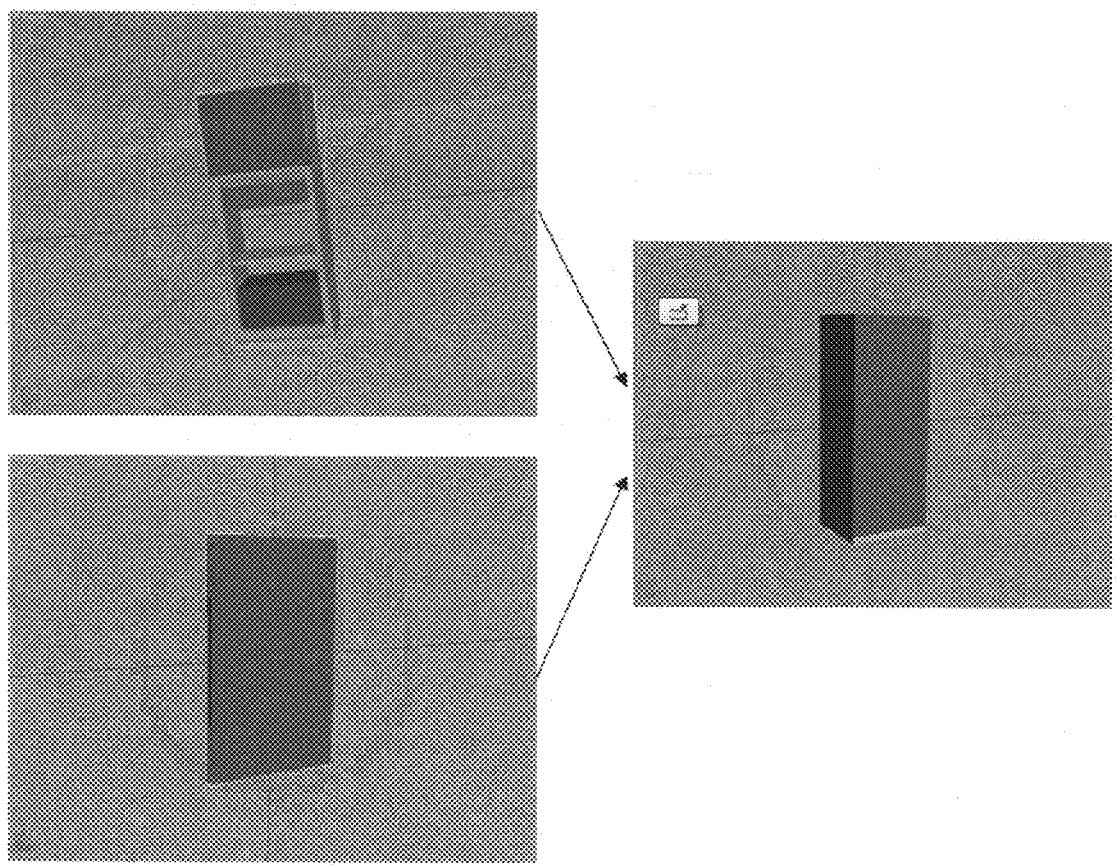
FIG. 11 is a diagram illustrating object configuration information in a structural information layer in accordance with an embodiment of the present invention.

The geometric information layer for an object is information about geometric features and stores geometric information of an object in structural form. The geometric information is obtained from a raw image. The geometric information layer includes a method for modeling an object having sub-parts and a method for representing object feature for understanding information of upper layers and linking with the information of the upper layers, not a method for generating a model for object recognition based on rigid body. For example, if an object is a refrigerator, the object is divided into an upper door, a lower door, a freezing compartment, a cool chamber, a drawer, and a handle. In case of a predetermined space, the space is divided into a door, a ceiling, a column, a corner, etc. FIG. 11 shows a refrigerator as example.

Figure 10A:
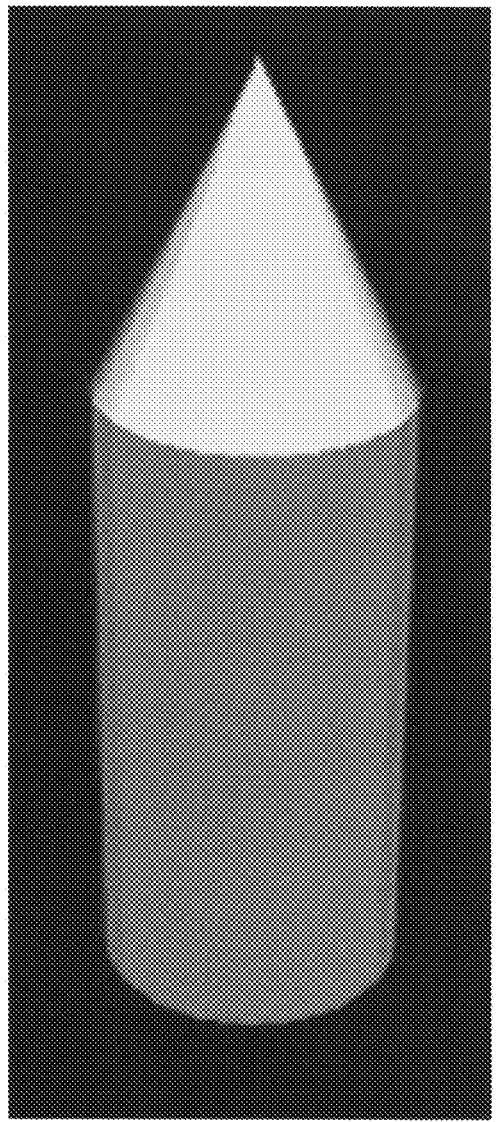
FIG. 10a is a diagram showing a result of modeling a pencil, which is a 3D object, in a x3d file of CAD forms in accordance with an embodiment of the present invention.

Well known CAD formats, x3d, dfx, 3ds, wrl, or obj may be used as a data structure for the geometric information layer for an object, or a predetermined storage structure may be created. However, it is required to develop a separate format because all geometric information cannot be represented in a CAD format. For convenience, a data format of a CAD model is used in simulations according to the present invention. FIG. 10a is a diagram showing a modeling result of a pencil, which is a 3D object, in x3d file that is one of CAD formats in accordance with an embodiment of the present invention. FIG. 10b is a diagram illustrating a modeling code of x3d of FIG. 10a.

The structural information layer for an object is information about a structure of an object. That is, the information describes constituent elements of an object. The structural information layer is managed linked with information in lower information layers which have geometric and photometric features. For example, a cup includes constituent elements, a main body and a handle. The constituent element means sub-parts of a cup. Therefore, it is necessary to be linked with sub-parts information of lower information layers having the geometric and photometric feature information. FIG. 11 is a diagram illustrating constituent information of an object in the structural information layer in accordance with an embodiment of the present invention. As shown in FIG. 11, a refrigerator includes a main body, an upper door, a lower door, a freezing compartment, a cool chamber, and a shelf. In FIG. 11, a left upper diagram illustrates a main body of a refrigerator, a left lower diagram illustrates a door of a refrigerator, and a right diagram illustrates a diagram with the main body and the door combined.

Figure 12A:
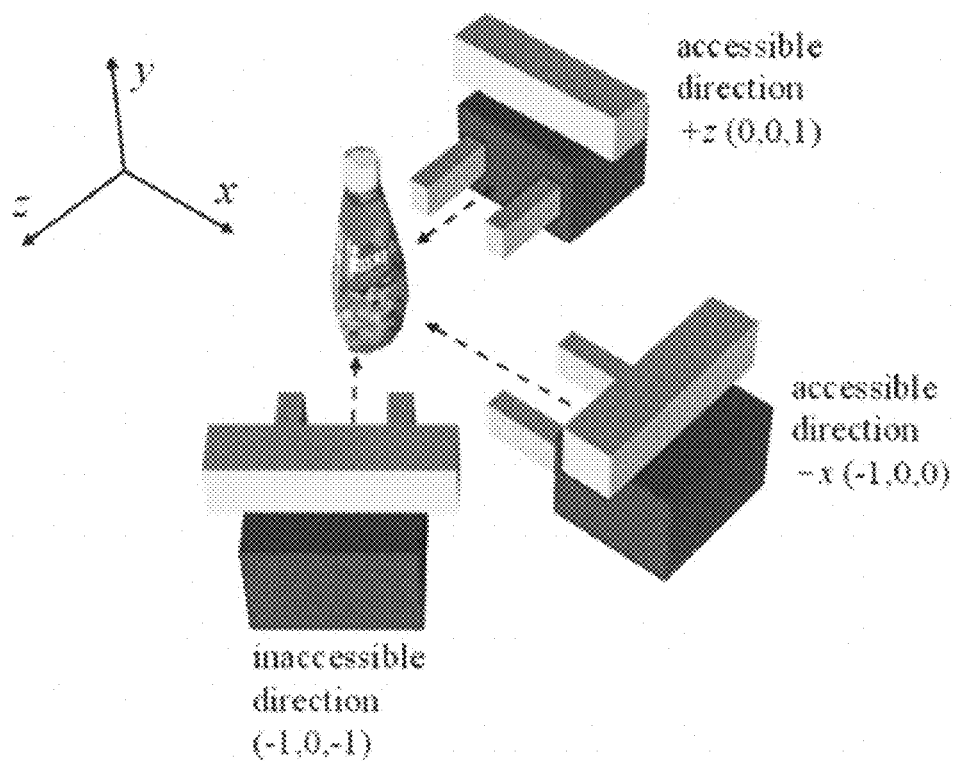
FIG. 12a is a diagram illustrating an accessible direction to an object in a topological information layer in accordance with an embodiment of the present invention.
Figure 12B:
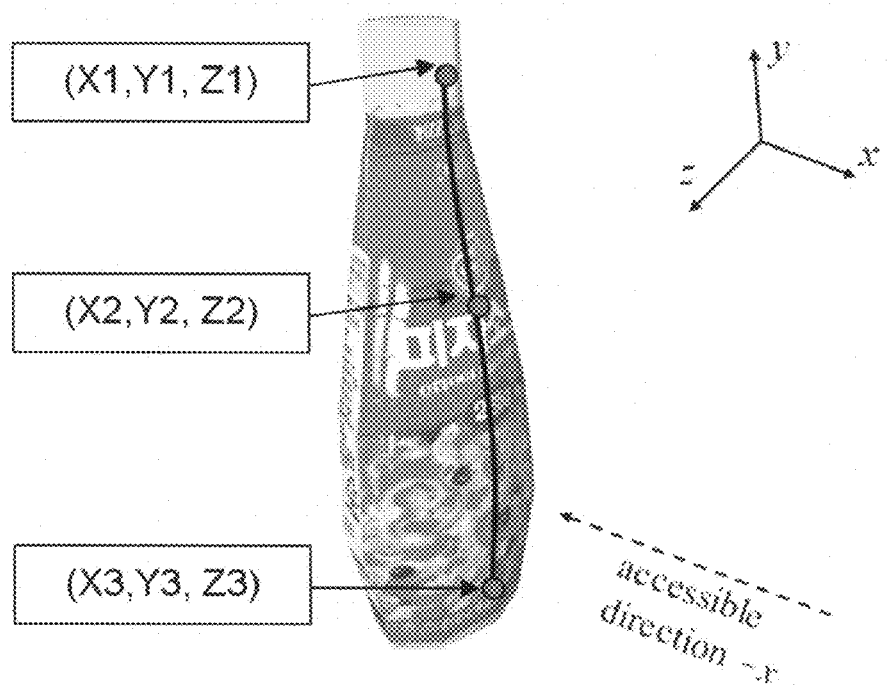
FIG. 12b shows contact points of an object in a topological information layer in accordance with an embodiment of the present invention.

The topological information layer for an object includes information that represents accessibility for gripping an object. The accessibility is one of properties of an object. That is, the topological information is information related to which part of an object can be gripped by accessing the object in which direction. FIG. 12a is a diagram illustrating a direction of accessing an object in the topological information layer in accordance with an embodiment of the present invention, and FIG. 12b shows contact points of an object in the topological information layer in accordance with an embodiment of the present invention. As shown in FIG. 12, the information includes a plurality of 3D contact points for gripping the object and accessible directions represented as 3D direction vectors.

Figure 13:
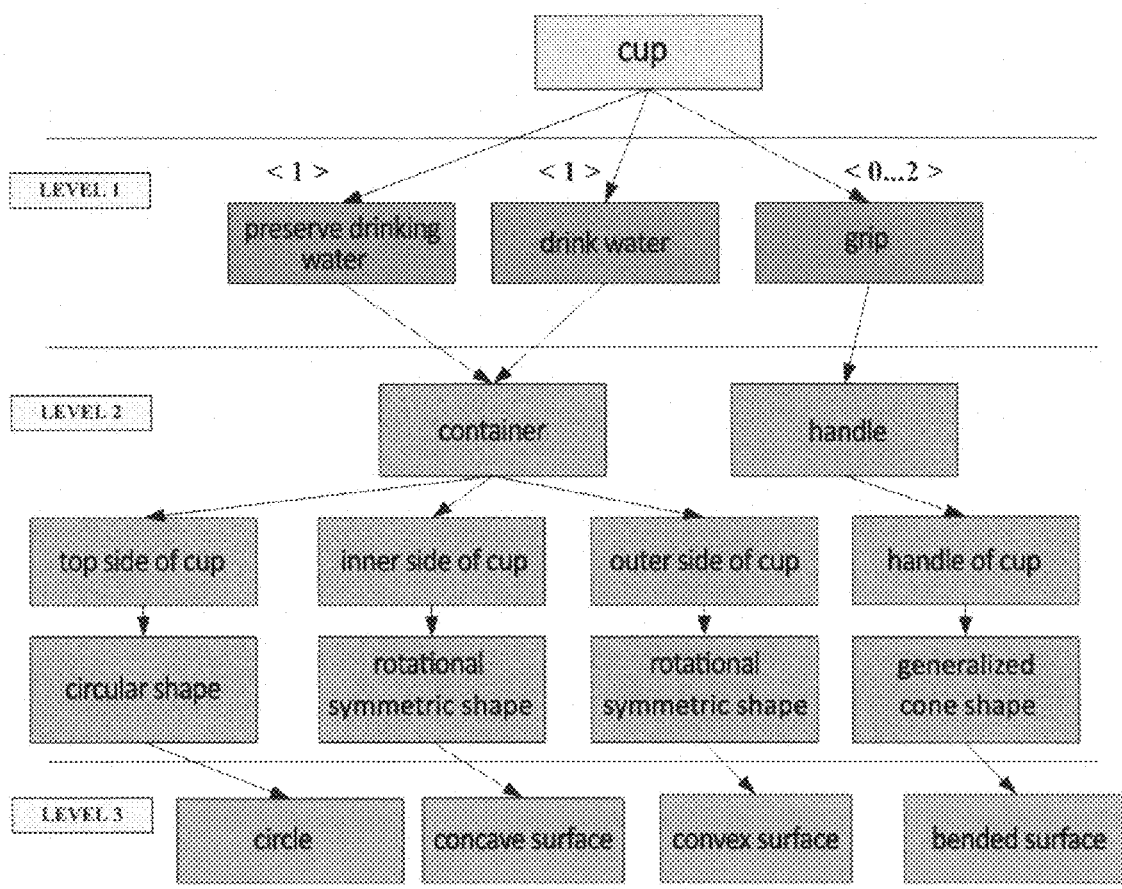
FIG. 13 is a diagram illustrating a generic model of a cup in accordance with an embodiment of the present invention.

The generic information layer for an object is an information layer storing a generic object model. The generic information represents an object in one abstract structure by gathering common geometric features of an object together for a specific model or instance in a specific object class. For example, general features of a cup may be structurized into a function of preserving a drinking water, a function of driving a water, a function of gripping and lifting up, a hollow providing a predetermined volume for putting a drinking water therein, a handle for enabling a robot to grip, a cylindrical shape body, an ellipse representing an upper part of a cup, a concave surface and a convex surface representing interior and exterior features of a cup. If specific model of an object, that is, unique instance model of an object are not provided, the generic information is used to create a model of an object or to recognize an object. Also, the generic information is used when an optimal segmentation method for recognizing an object is introduced, when a function of each sub-part is reasoned by recognizing a sub-part, and when an effective recognition process is searched according to an object. FIG. 13 is a diagram illustrating a generic model of a cup in accordance with an embodiment of the present invention. As shown in FIG. 13, the generic model of a cup represents functions of a cup in a first level 1, represents sub-parts of a cup in a second level 2, and represents the most similar geometry enabling reasoning of each sub-part.

The spatio-temporal information layer for an object is about context spatio-temporal information. The context includes an object-space temporal dependency that represents how a location of an object changes in a time domain, an object-object spatiotemporal dependency that represents how an object is influenced by existence of the other object, an object presence and spatiotemporal dependency that represents effect influenced to existence of the other objects when a specific object is in a specific temporal space, an object-function spatiotemporal dependency that represents how a function of an object changes according to a time and a space, and an object-physical feature spatiotemporal dependency that represents what features of an object, such as a shape, a color, texture, and transparency, are changed according to a time and a space or according to environmental information.

Figure 14:
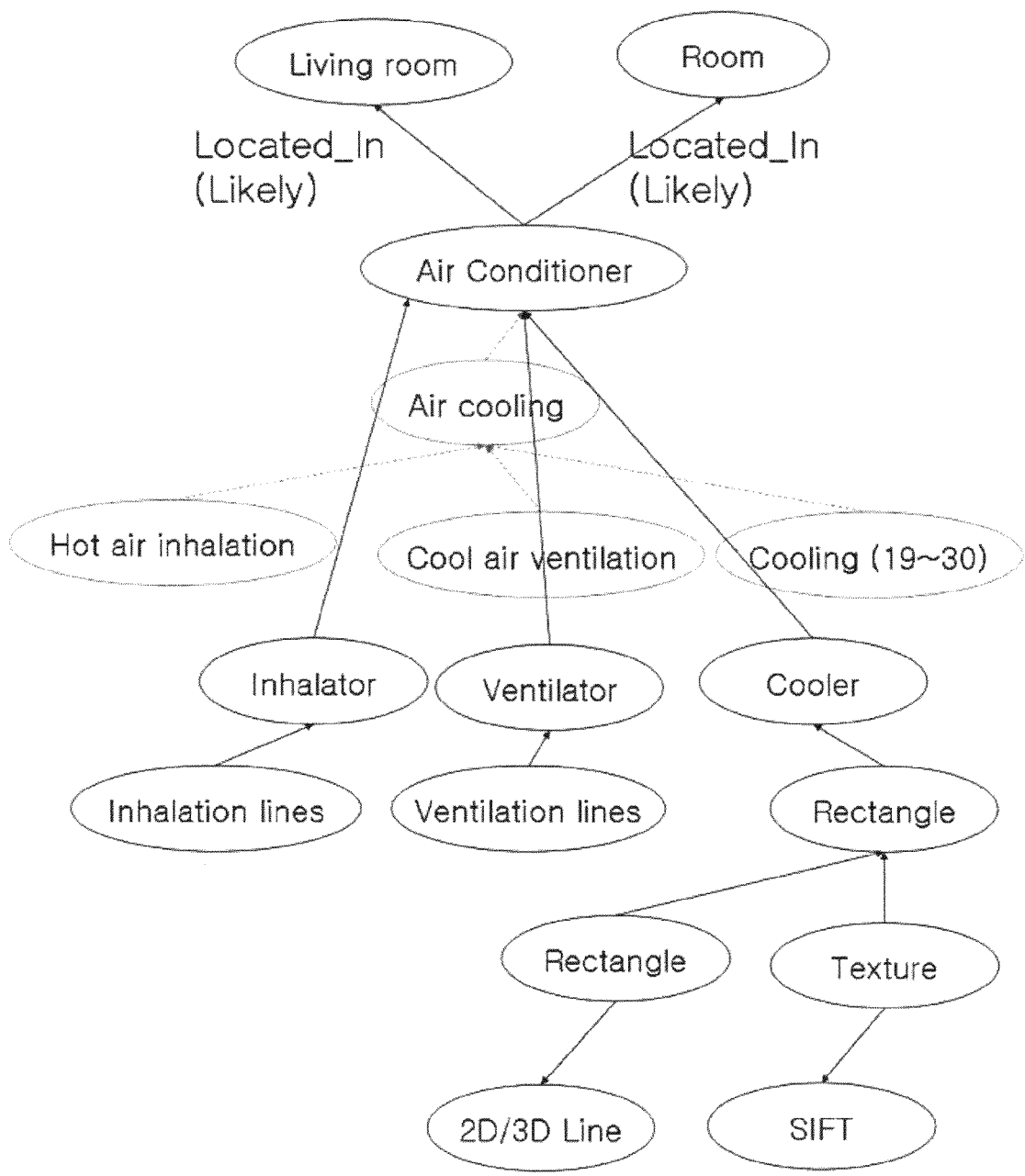
FIG. 14 is a diagram illustrating an evidence structure of an object in accordance with an embodiment of the present invention.

The reasoning information layer for an object represents relation with lower information layers, common senses for object recognition, and probability of each evidence in a graph as an evidence structure. FIG. 14 is a diagram illustrating an evidence structure.

The space and object reasoning unit 35 searches and reasons upper layer information such as semantic information, spatio-temporal information, common-sense information, evidential information, context information, or the like, from the given lower layer information. Meanwhile, the space and object reasoning unit 35 also searches and reasons lower layer information to be used for comprehension of the object or space from the upper layer information. The space and object reasoning unit 35 performs reasoning using reasoning information of the reasoning information layer, performs semantic reasoning using semantic information in the generic information layer or the spatio-temporal information layer, or performs reasoning using a method for searching objects matched with predetermined properties or features using information in lower information layers. For example, if there exists a reasoning structure of the upper information layer that a refrigerator is usually in the kitchen and the refrigerator is an object that has lines and a hexahedron as basic geometry primitive, in order to perform a mission of "find the refrigerator", a process for reasoning the current location of the refrigerator and, if a plurality of lines is detected, a process for discriminating what the detected lines are should be performed simultaneously. This means that a bottom-up process and a top-down process are conducted at the same time. In case that the mission is to find a refrigerator and ID of the refrigerator is given, in order to find the refrigerator, it is required a reasoning process that the kitchen should be found first (spatio-temporal information layer) and then it should be reasoned what kind of features and components the refrigerator has (reasoning information layer/generic information layer). Using the results of these reasoning processes, the actual object/environment is recognized and comprehended from the lower layer object/environment instances (structural information layer/geometric information layer). This may be considered as a top-down process. At the same time, if a plurality of lines is detected in a scene, a discrimination process for identifying whether the lines are for an air-conditioner or a refrigerator should be performed (structural information layer/geometric information layer). That is, it needs a process for reasoning the object identification (generic information layer/reasoning information layer) using lower layer information. This may be considered as a bottom-up process. Particularly, the space and object reasoning unit 35 performs reasoning using an ontology reasoning engine if the information about a space or object is composed in ontology.

The mission analysis manager 36 creates and stores a probability based behavior structure that decides a unit behavior of a robot from a given mission and returns a created behavior structure to a robot by a request from the broker unit. The mission analysis manager 36 also analyzes a mission given to a robot, extracts a unit behavior to perform and necessary information for the behavior, and returns the extracted unit behavior and information to the robot.

The mission analysis manager 36 creates the behavior structure as a Bayesian network having a probabilistic precedence relation of perception data, an evidence structure and behavior, decides an optimal path based on a probability of the precedence relation, and extracts a behavior on the path as a unit behavior to perform.

Figure 15:
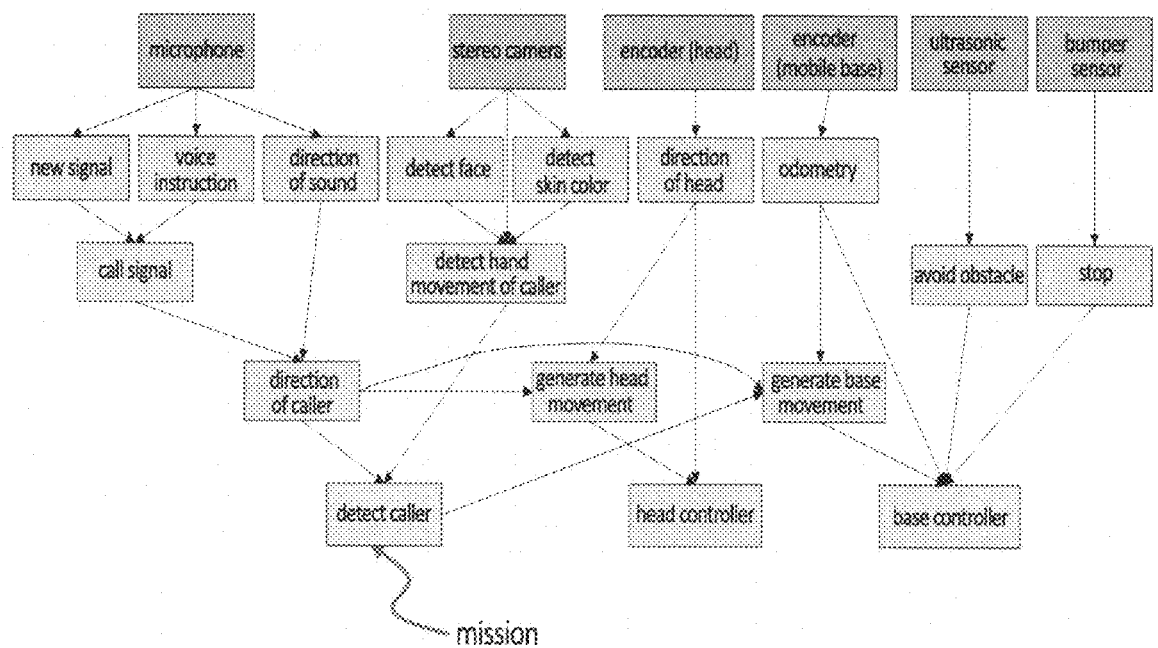
FIG. 15 is a diagram illustrating a behavior structure represented by a Bayesian network in accordance with an embodiment of the present invention.

FIG. 15 is a diagram illustrating a behavior structure in accordance with an embodiment of the present invention. As shown in FIG. 15, a robot may receive missions such as "fetch a cup", "find a cup in a room", or "find and fetch a cup". The mission "fetch a cup" can be divided into behaviors "find a location of a cup", "navigate to the cup", "grip the cup", and "return to original location". Also, the mission "find a cup" can be divided into behaviors "obtain shape and photometric features of a cup", "look around", "find object having a matched shape in image", "turn on light if it is dark", "find switch for light", "navigate to switch", "obtain information for turning on switch" and "turn on the switch as the information". In this case, the robot analyzes a mission by unit orders. The robot may refer rules to analyze the missions. However, a probability based Bayesian network is created with various situations in the present embodiment because a mission may be divided into various specific missions such as turning on a light or drawing a curtain back if it is dark.

As described above, a Bayesian network of a predetermined mission is composed in stages, and an optimal path is selected based on a probability. The robot performs unit behaviors on the selected optimal path. If the robot fails to perform one of the unit behaviors on the selected optimal path, the robot performs unit behaviors of a next optimal path.

If the robot needs information for performing the unit behaviors, necessary information thereof is extracted and returned. Here, the necessary information, for example, includes information about "cup", "switch", "method for gripping a cup", "method for turning on a switch", "photometric feature of a cup".

The interface 32 of the central information processing system according to the present embodiment processes an information request from a mobile service robot 10. Hereinafter, the operation of processing the information request in the interface 32 will be described in detail.

The interface 32 performs necessary operations for simple information requests from the mobile service robot 10. That is, if the mobile service robot 10 request spatial information of location information of an object and an obstacle, the interface 32 fetches stored information and transmits the fetched information to the mobile service robot 10.

The interface 32 creates a united map by combining spatial information of a base map information layer and information of an object and an obstacle location information layer and provides the created united map to the robot if the robot requests a map. The robot mainly uses the united map to navigate.

The interface 32 can also transmit reasoning results. For example, if the mobile service robot 10 requests spatial information to perform a mission "fetch a cup", the interface 32 requests the space and object reasoning unit 35 to reason about details of a cup. Therefore, the interface 32 detects a location of the reasoned cup at the space and object reasoning unit 35 and transmits the spatial information from a current location of the robot 10 to a location of a cup. Here, the interface 32 may transmit results of recognizing other objects in the related space as obstacles instead of transmitting information about all of objects from the current location to the location of the cup. It is because, the other objects in the related space do not have any meaning when the robot performs a mission "fetch a cup". That is, the interface 32 may provide only the information according to a recognition/reasoning level of the service robot 10. For example, when an intelligent mobile service robot built for cleaning receives a mission "clean a floor", the interface 32 recognizes all objects on the floor as obstacles and transmits a united map or an obstacle map composed with the recognized objects to the intelligent mobile service robot. It is decided according to a recognition/reasoning level of a service robot 10, and a proper interface is embodied according to the level thereof. The interface 32 receives information recognized by the service robot 10 and updates stored information based on the received information. That is, the central information processing system 30 also enables robots to share information through updating as well as providing information in one direction. That is, the central information processing system 30 may operate as a memory, not a database. For example, if a user has a medicine, which was on a tea table in the morning, at a lunch time, the medicine is not on the tea table any more. Such information must be shared with robots. That is, if an object is disappeared, moved, or newly located in a predetermined indoor space, a service robot 10 recognizes states different from spatial information received from the central information processing system 30 and transmits the recognized information to the central information processing system 30.

It is preferable to limit information updated by a robot to information stored in the lower information layers of the topological information layer. It is because that the information of the lower information layers of the topological information layer is exterior features of an object which are measured through sensing operations of the robots. However, information stored in the upper information layers of the topological information layer is semantic information. In order to sustain reliability of the information, such information must be updated only by robots having high level intelligence for learning and reasoning. That is, it is unreliable to change information about an object and semantic information of upper information layers based on a robot's determination due to capability and limitation of a service robot up to now. If a service robot has a reliable spatial recognition ability and object modeling capability in a near future, the service robot will be able to update information of the upper information layers.

As described above, each of the robots accesses the central information processing system 30, and obtains and modifies information. Since the central information processing system 30 does not make decision to reason new data or to control the robots 10, user's capability may be more important to increase performance of each robot 10 in order to improve overall performance. However, effective information management through framework and a layered information policy make input/output more clear and modules worked together.

Hereinafter, simulations made using the framework of the central information processing system 30 according to an embodiment of the present will be described with reference to FIGS. 16 to 25.

Figure 16:
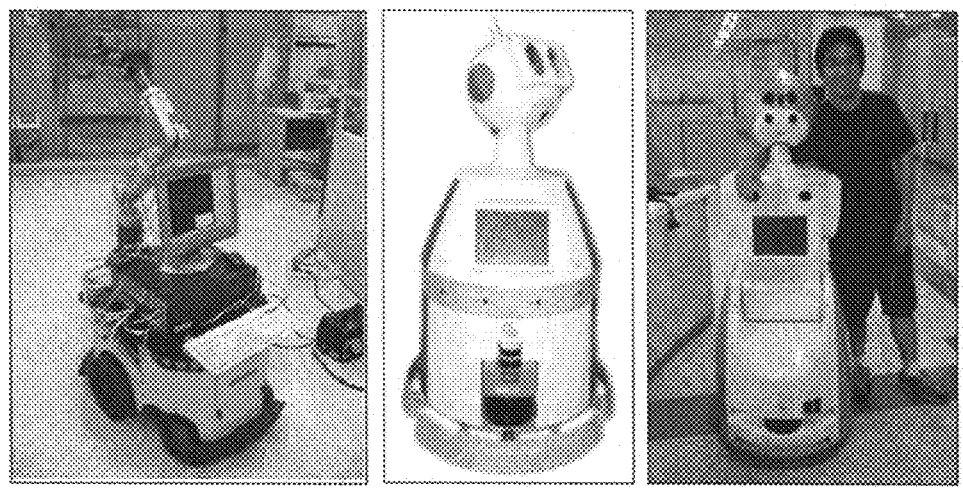
FIG. 16 is a diagram illustrating a robot used in simulations according to an embodiment of the present invention.
Figure 17:
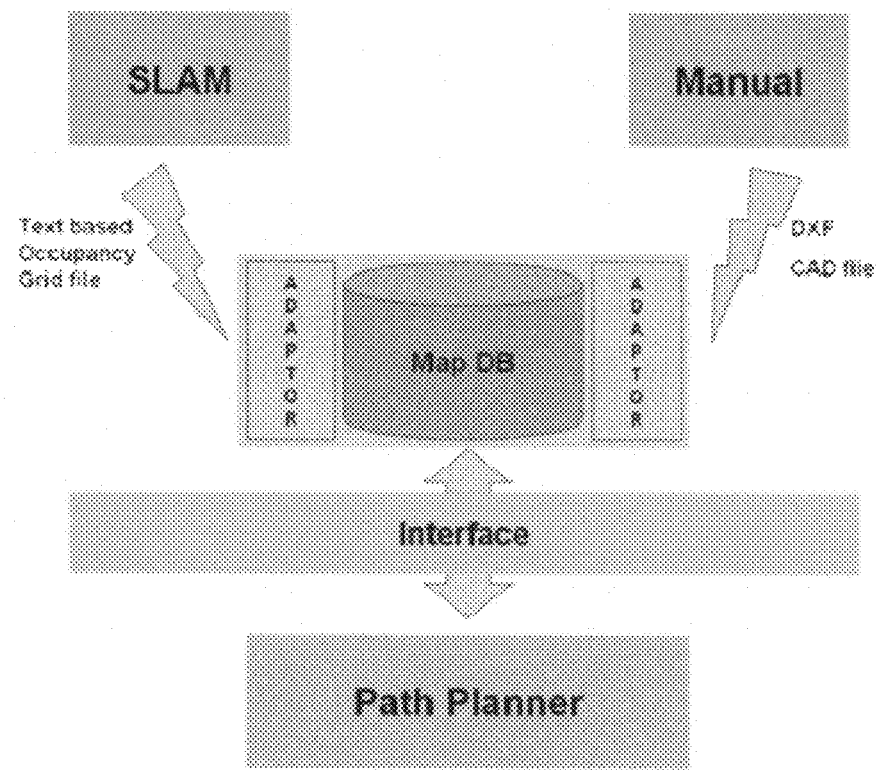
FIG. 17 is a diagram illustrating input/output relation of a map DB in a spatial information manager in a simulation according to an embodiment of the present invention.
Figure 18:
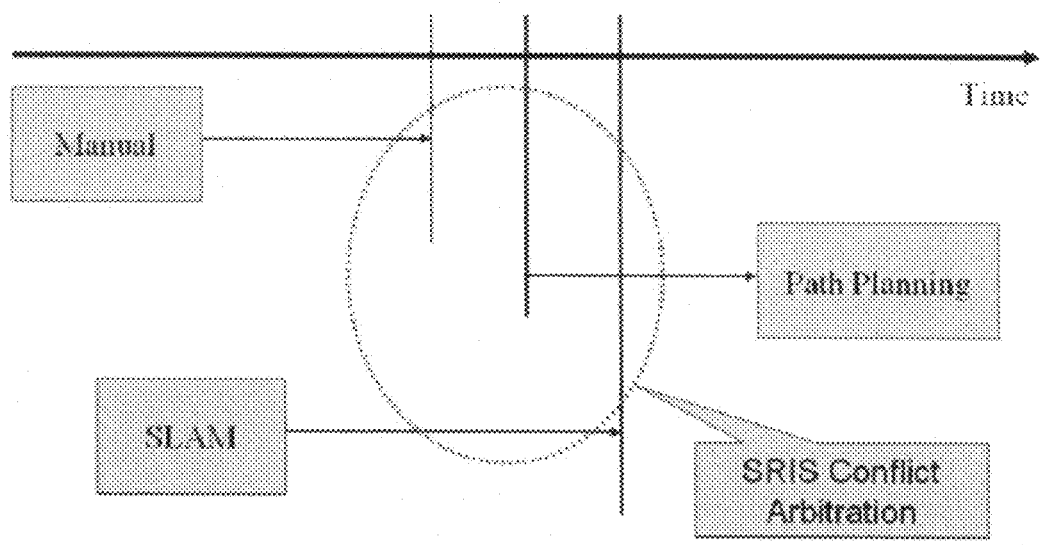
FIG. 18 is a time diagram used in a simulation according to an embodiment of the present invention.
Figure 19:
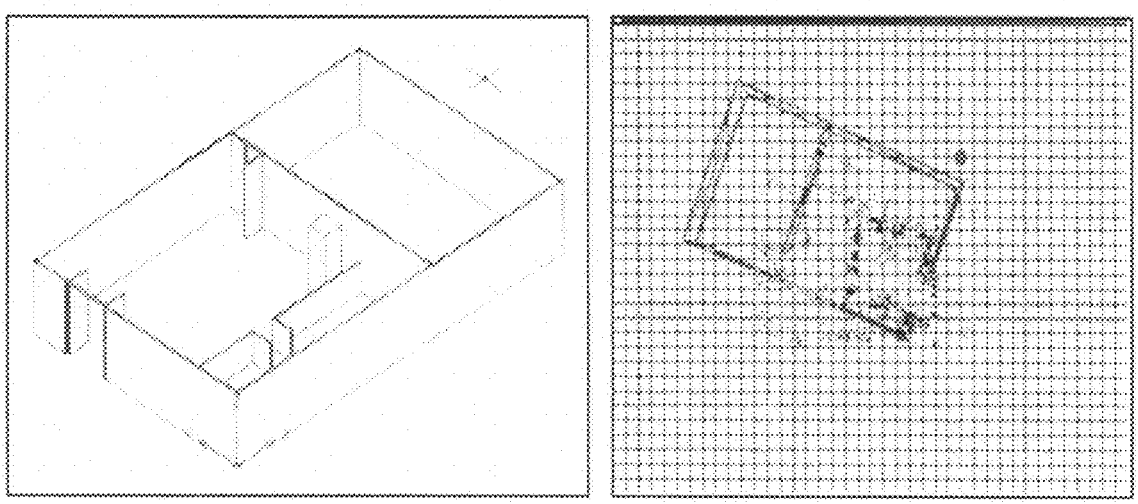
FIG. 19 is a diagram illustrating a 3D map (left) and a united SLAM map (right) provided through a manual according to an embodiment of the present invention.
Figure 20:
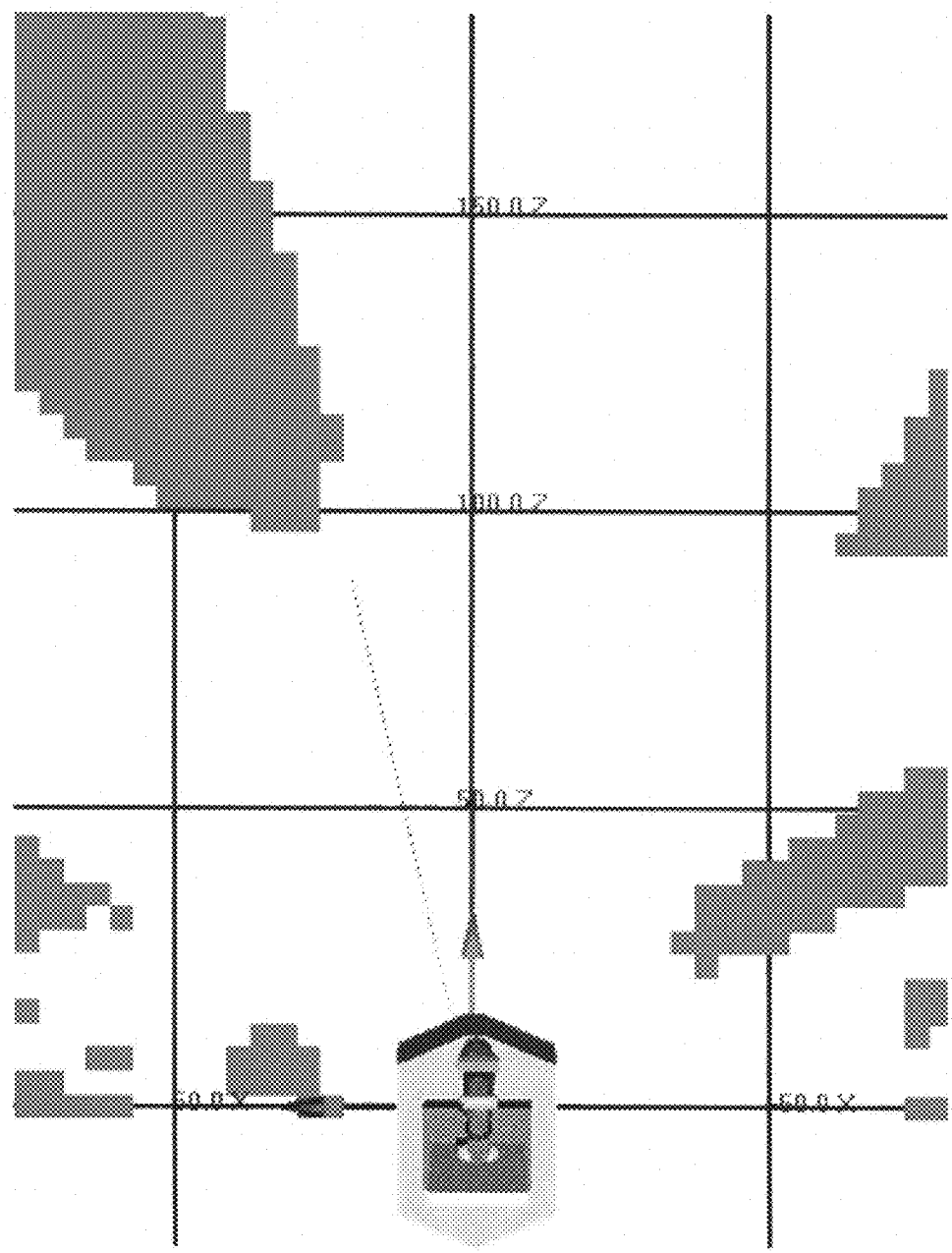
FIG. 20 is a diagram illustrating a navigation simulation using a path planner of a robot according to an embodiment of the present invention.
Figure 21:
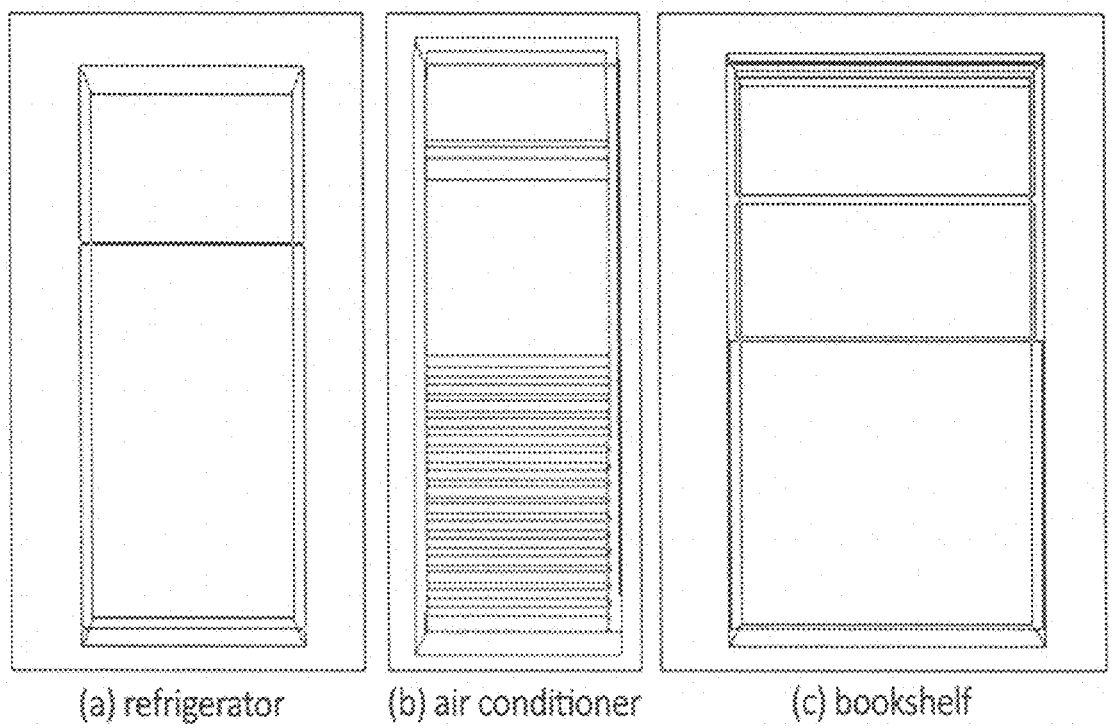
FIG. 21 is a diagram illustrating similar object models stored in a structural information layer according to an embodiment of the present invention.
Figure 22:
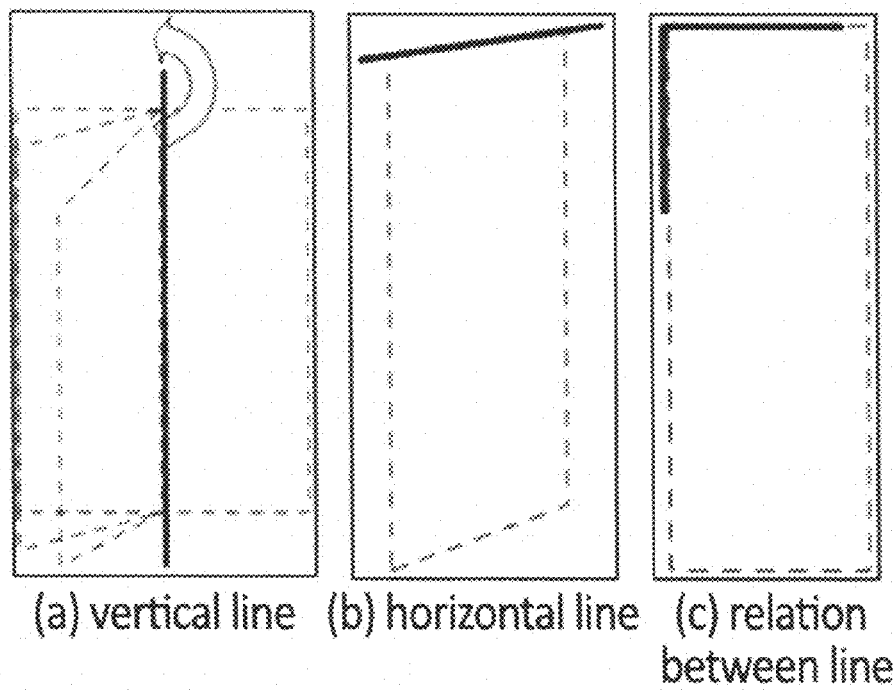
FIG. 22 is a diagram illustrating generation of initial particles using ontology in a simulation according to an embodiment of the present invention.

FIG. 16 is a diagram illustrating a robot used in simulations according to an embodiment of the present invention. FIG. 17 is a diagram illustrating input/output relation of a map DB in a spatial information manager in a simulation according to an embodiment of the present invention. FIG. 18 is a time diagram used in a simulation according to an embodiment of the present invention. FIG. 19 is a diagram illustrating a 3D map (left) and a united SLAM map (right) provided through a manual according to an embodiment of the present invention. FIG. 20 is a diagram illustrating a navigation simulation using a path planner of a robot according to an embodiment of the present invention. FIG. 21 is a diagram illustrating similar object models stored in the geometric information layer according to an embodiment of the present invention. FIG. 22 is a diagram illustrating generation of initial particles using ontology in a simulation according to an embodiment of the present invention. FIG. 23 is a diagram illustrating steps of recognizing a space or an object in a simulation according to an embodiment of the present invention.

<First Simulation> Vision Based Navigation and SLAM Map Update

The first simulation was focused to reduce data redundancy and to guarantee data concurrency and validation among requirements of a central information processing system for service robots 10. The robots 10 shown in FIG. 16 include two map update modules. Also, the central information processing system 30 processes information from SLAM and a manual based on a policy system that prevents collision and builds a database thereof. The information from the manual is information input by a system manager. The information from SLAM is information created by combining information sensed and recognized by robots 10 in a predetermined indoor space. The path planner is used to connect the central information processing system 30 and to receive new information from the central information processing system 30. That is, the central information processing system 30 receives spatial information from the robots by SLAM, manages overall map based on the manual, and transmits the map to robots if the robots request a map.

The result of the simulation is shown in FIGS. 19 and 20. The left map of FIG. 19 is a 3D map provided beforehand to robots 10 through a manual, and FIG. 20 is a diagram for describing simulations that represents data received through vision in Octree, forms an occupancy grid through SLAM process, and enables a robot 10 to navigate through paths generated by a path planner using the occupancy grid.

<Second Simulation> 3D Object Recognition

The second simulation was performed for verifying that information layers according to the present invention can improve efficiency. In the second simulation, a robot receives a mission "approach to a refrigerator for gripping a target object in the refrigerator, find the target object, juice, in the refrigerator, and detect accurate location of the target object.

Since a rough location of the refrigerator is shown in a map stored in the central information processing system 30, a robot finds, navigates, and approaches to a refrigerator like the first simulation. If the robot meets an object similar to the refrigerator shown in FIG. 21 while finding the refrigerator, the robot detects a comparative spatial location between the robot 10 and the refrigerator using not only information in the geometric information layer and photometric information layer but also constraint knowledge for matching, which is composed as an evidence structure of the reasoning information layer. For example, locations and the number of horizontal lines are important information for a robot to discriminate the refrigerator from an air conditioner. In order to discriminate the refrigerator from a book shelf, the robot must check a ratio of horizontal lines and vertical lines. If the robot has difficulty to discriminate the refrigerator from the similar objects using relations between lines, the robot must use a reasoning result to match. That is, the robot uses an ontological inference that a refrigerator needs a handle and an air conditioner does not need a handle. That is, the robot finds SIFT of a handle from the photometric information layer the an object based on the reasoning about the handle and determines whether the object is the refrigerator or not through handle SIFT matching. FIG. 22 shows line models made based on ontology reasoning information and geometric features of the object.

After the robot 10 arrives at the refrigerator, the robot 10 looks in the refrigerator and starts finding the target object. The robot 10 makes a plan for sensing the target object based on knowledge that a location of the target object can be further accurately predicted through SIFT matching when a searching area is sufficiently small and information in the spatio-temporal information layer that the target object is in the refrigerator. Such a sensing plan makes the robot 10 to accurately detect the location of the object. FIG. 23 shows that the robot 10 finds the target object, juice, using information in the photometric information layer and the actual measurement information layer after arriving at the refrigerator.

It is possible to reduce operation time of a robot by decreasing an unnecessary searching area for performing a given mission and improving certainty for found target while searching using layered information through the central information processing system 30 according to the present embodiment. It means that the performance of a service robot can be improved by supporting integral information processing according to the present invention.

<Third Simulation> Fetch a Cup from a $N^{th}$ Floor in a Building A.

Figure 24:
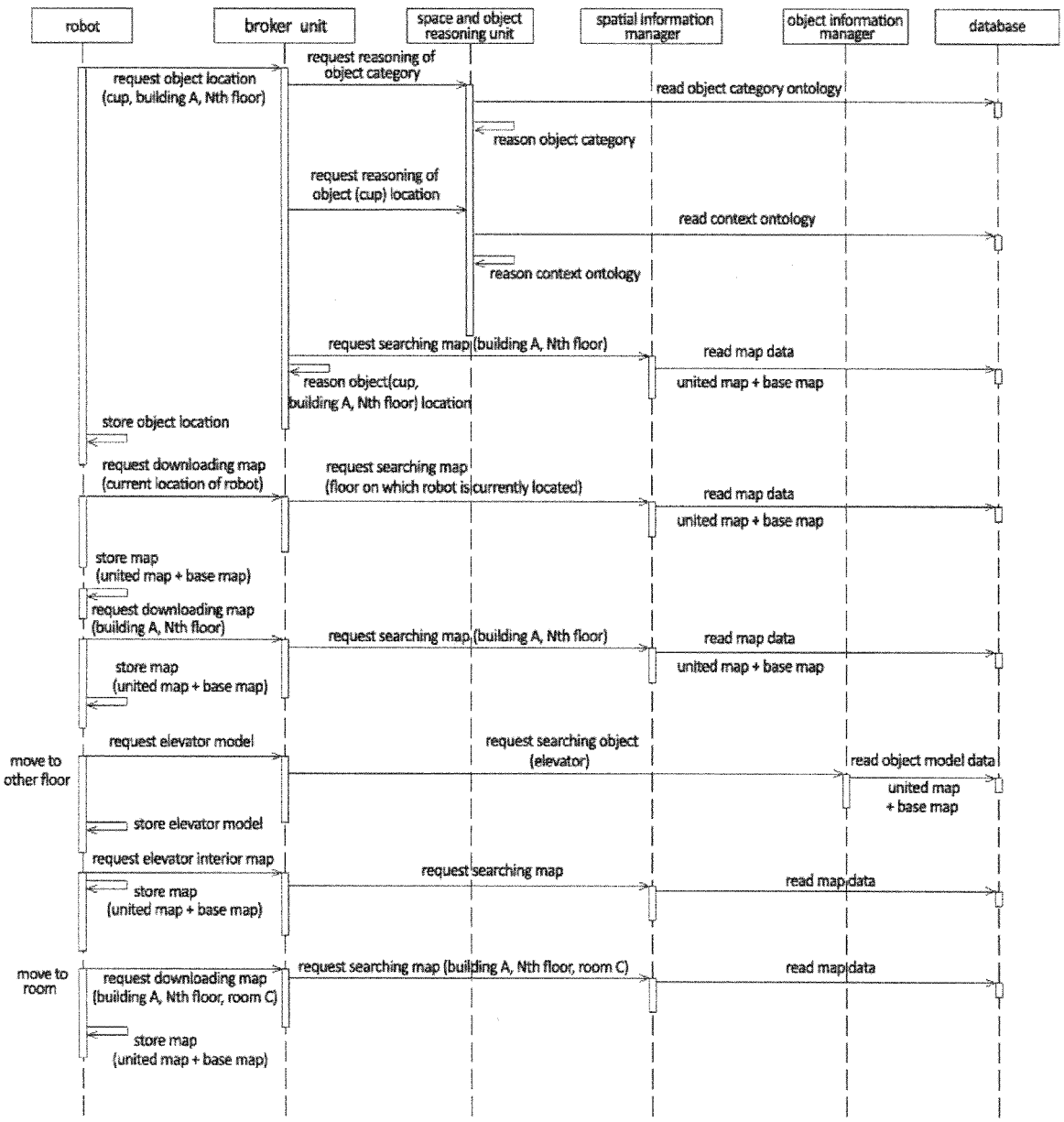
FIG. 24 is a flowchart illustrating communication between a robot and a central information processing system while a robot is navigating in another simulation in accordance with an embodiment of the present invention.
Figure 25:
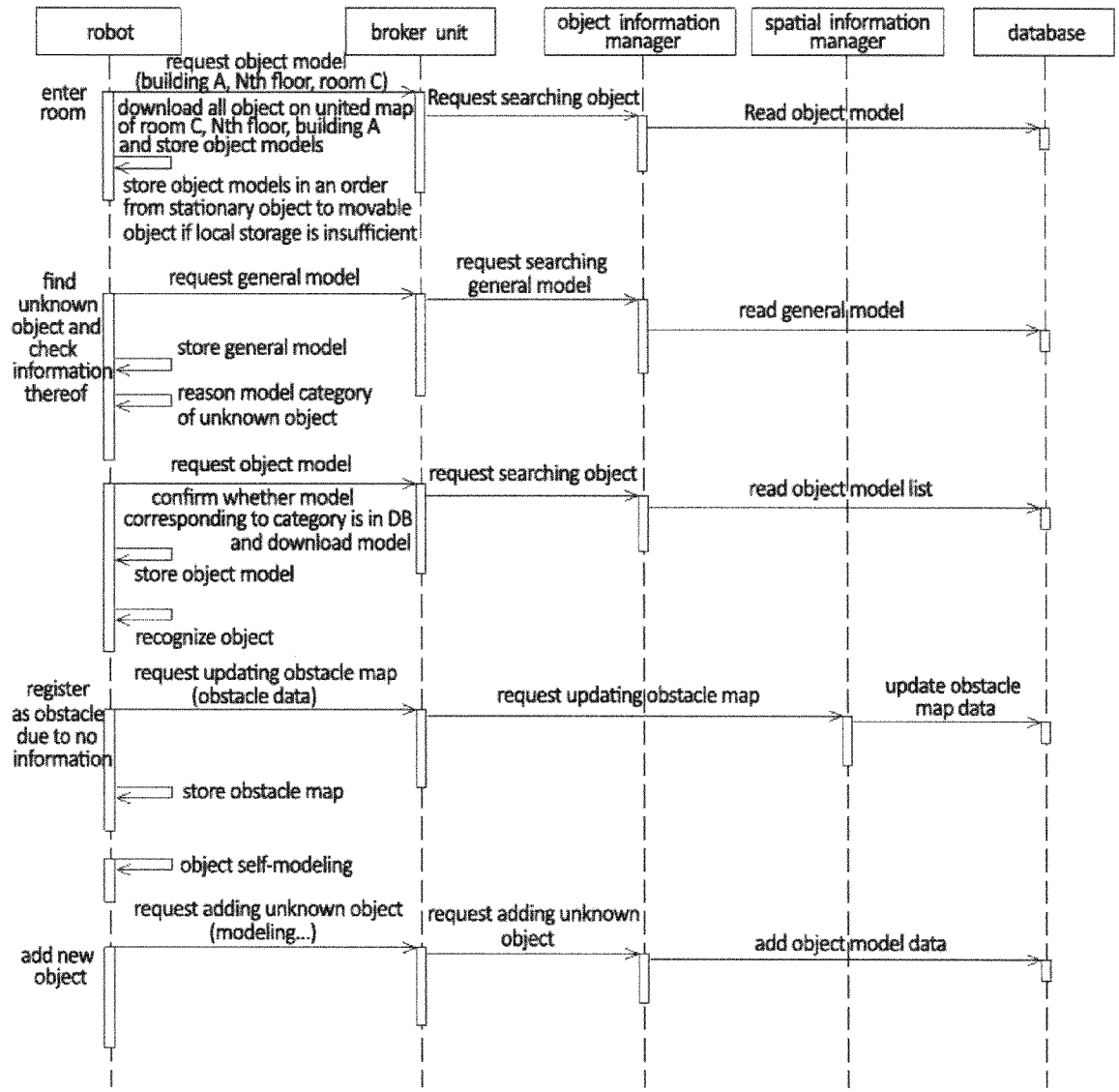
FIG. 25 is a flowchart illustrating steps of entering a room and finding a target object for performing a given mission in another simulation in accordance with an embodiment of the present invention.

The third simulation according to an embodiment of the present invention will be described with reference to FIGS. 24 and 25. FIGS. 24 and 25 show a robot performing a mission "fetch a cup from a Nth floor in a building A" using the central information processing system according to an embodiment of the present invention.

At first, the central information processing system 30 must have a map for the building A and the indoor spaces thereof and object models, which are input by a system manager in advance, in order to enable a robot to perform the given mission. The manager performs modeling for a space and an object on information of each of information layers, as defined in FIG. 4. Here, the indoor map which is actual measurement information is stored in a 2D grid map and a CAD model formation according to IFC 2xx specification, which is a basic building plan composing rule and an international standard format for building design. That is, the map is stored in a format of ifcXML or dfx, and the object is stored in a form of x3d, dfx, 3ds, wrl, and obj. Such information is registered and stored in the database 20. If it is necessary to modify an object/map model, related information from the DB is corrected. Then, the information is updated in a DB server. In order to correct and modify, the central information processing system 30 must include a modeling unit (not shown). Since the modeling unit is a well-known commercial graphic modeling unit such as 3D Architect, Auto CAD, 3D Studio Max, and Maya, the detail description thereof is omitted. If the robot finds a new object which was not known and stores the found object in a DB, it may be required for a manager to directly record information thereof in the DB because the robot has not information about a name and a category thereof.

FIG. 24 is a diagram illustrating communication between a robot and a central information processing system when the robot navigates to a room C on a $N^{th}$ floor in a building A in order to perform a mission "go $N^{th}$ floor of a building A and fetch a cup therefrom".

As a first step, it is necessary to inform the robot of a term of cup as a specific model required for recognition in order to enable the robot to understand the cup because the robot 10 does not know what a cup is. Therefore, the robot requests a location of a target object, the cup, to the broker unit 31 (or corresponding interface 32). The broker unit 31 reasons about a class of the term "cup" through the spatial object reasoning unit 35 and confirms that the cup is an object for putting a drinkable liquid therein and has an separate category among categories of all objects through reasoning. Then, the broker unit 31 searches the topological information layer to determine where object corresponding to the category of cup is generally located, and detects that the object is generally located on a kitchen or a desk in a room C on the $N^{th}$ floor. The broker 31 requests a map for the room C on the $N^{th}$ floor to the spatial information manager 33 using the detected information, confirms if a location of the cup is recorded by analyzing locations of objects and obstacles in the structural information layer stored in the spatial information DB 22 and transfers the information thereof to the robot. The robot 10 locally stores the searched cup location, requests a map of a current floor where the robot is currently located and a united map of the $N^{th}$ floor to the broker unit 31, and downloads and stores the requested maps in a local map DB in order to navigate to the room C on the $N^{th}$ floor. Here, if the robot already stores a united map for the current floor in the local map DB, the robot does not download the united map from the broker unit 31.

Then, the robot finds an elevator to move to the room C on the $N^{th}$ floor. The robot checks a rough location of an elevator using the map for the current floor. While moving, the robot requests an elevator model to the object information manager 34 through the broker unit 31 to recognize the elevator and downloads the elevator model from the object information manager 34. The elevator model is formed of an evidence structure that represents determination references for object recognition in the reasoning information layer as a probability graph, a generic model of the generic information layer representing general features of an object, and a CAD model representing geometric features of the geometric information layer. Remaining information layers are filled with Null values because the elevator model does not have texture and reflects light excessively. After the robot recognizes the elevator, the robot is required to push a button, ride the elevator, and operate buttons on a control panel of the elevator. Therefore, an elevator interior model is also required. Since the elevator interior model is spatial information unlike the outside of the elevator, the robot requests the elevator interior model to the spatial information manager 33 and receives the elevator interior model with a united map from the spatial information manager 33.

FIG. 25 is a diagram illustrating steps for entering the room C on the Nth floor of the building A and finding the target object therefrom using information provided from the central information processing system 30 according to an embodiment of the present invention in order to perform the mission "go $N^{th}$ floor of a building A and fetches a cup therefrom". If the robot finds unknown objects, steps for including the unknown objects in the object information are included. If there is no information about the found unknown object and no generic models for the found unknown object, operations for determining the found unknown objects as obstacles and updating spatial information are included.

When the robot arrives at the $N^{th}$ floor, the robot navigates to the room C using the downloaded united map. When the robot arrives at the room C, the robot needs spatial information (or map information) of the inside of the room C and information about stationary objects such as a refrigerator, a washing machine, and a desk and movable objects such as a cup, a watch, and a chair. Therefore, the robot 10 requests the spatial information and the object information to the broker unit 31. Then, the broker unit 31 requests the requested information to the spatial information manager and the object information manager, receives the requested information, and transmits the requested information to the robot 10. The robot 10 receives the requested information and stores in a local united map DB. Here, since the robot has a limited local storage capacity, the robot downloads and stores information in an order from stationary objects to movable objects until a predetermined storage capacity reaches.

After the robot enters the room C, if the robot finds an unknown object, the robot detects overall features thereof and confirms whether the object of the category having the detected feature is recorded in the central information processing system 30. The robot 10 requests generic model information to the broker unit 30. Then, the broker unit 31 receives a result of searching the requested generic model information from the object information manager and transmits the result to the robot 10. The robot reasons a category of the found object by comparing the recognized feature with the obtained generic model information. If the found object belongs to a predetermined class, the robot requests model data of the category to the broker unit 31. Then, the robot tries to recognize the unknown object using the received model from the broker unit 31. If the robot succeeds in recognition of the unknown object, the robot requests the broker unit 31 to update a location and a pose of the corresponding object, and the broker unit 31 requests the spatial information manager 33 to update object/obstacle information of the topological information layer and register a location and a pose of the object on the united map.

If the found object does not belong to any categories or if there is no specific model data for the found object although the found object belongs to a predetermined class, the third and fourth steps of FIG. 25 are performed. That is, an unknown object must be considered as an obstacle, and the information thereof must be reflected. The robot can navigate and manipulate safely by avoiding the obstacles using the obstacle information. Finally, the robot must create a model of the unknown object until a manager inputs information thereof. Therefore, the robot creates a model of an unknown object and stores the created model by modeling a shape and features of the unknown object through a modeling unit. Then, the robot requests the broker unit 31 to update related information of each information layer, mainly the lower information layer of the topological information layer, through the spatial information manager 33.

Figure 26:
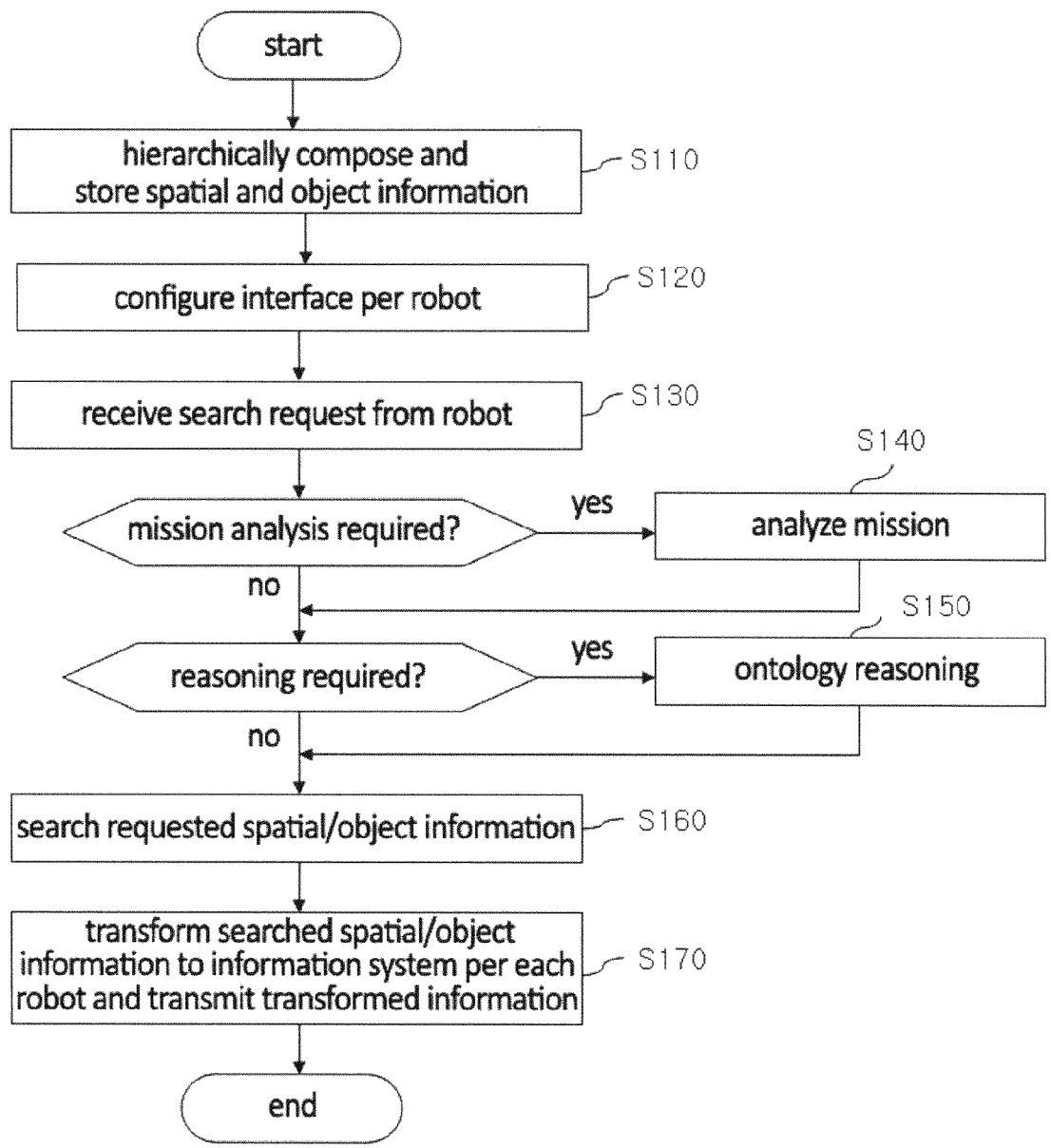
FIG. 26 is a flowchart illustrating a method for processing information for a service robot in accordance with an embodiment of the present invention.

Hereinafter, a method for processing information for a service robot in accordance with an embodiment of the present invention will be described with reference to FIG. 26. FIG. 26 is a flowchart illustrating a central information processing method for a service robot in accordance with an embodiment of the present invention.

As shown in FIG. 26, the method for processing information for service robots using a central information processing system communicating with at least one of service robots in an indoor, includes the steps of: a) hierarchically composing and storing spatial information and object information for the indoor according to a recognition/reasoning level; b) analyzing an information request of the service robots, transforming a format of the requested information to a format analyzable by the service robot, and transmitting the transformed information to the robot; c) receiving an information searching request for searching a spatial information or an object information from the robot; e) determining whether reasoning is required for searching information or not, and searching and reasoning upper layer information about the object or space using lower layer information obtained from real environment or object, or searching and reasoning lower layer information to be used for comprehension of the object or space from upper layer information; f) searching requested object information or requested spatial information; and g) transmitting searched spatial information or searched object information to the requesting robot.

The spatial information or the object information includes: an actual measurement information layer including actual measurement information; a photometric information layer including photometric features; a geometric information layer including information about sub-parts obtained by dividing an object or a space by a geometric structure; a structural information layer including information obtained by dividing constituent elements of a space or an object and symbolizing and layering information about the divided constituent elements; a topological information layer including information for representing locations of objects or obstacles in a space; a generic information layer including information about generic models of a space, an object, or constituent elements of the space or the object; a spatio-temporal information layer including information about variation and relation of objects or a space according to a time and a space; and a reasoning information layer including reasoning information for reasoning about a space, an object or states of the space or the object from object or spatial information of lower information layers.

The actual measurement information layer for a space includes base map information having geometric information of an indoor space. The photometric information layer for a space includes a photometric feature map of an indoor space.

The geometric information layer for a space includes geometric information of sub-parts obtained by dividing an indoor space geometrically. The topological information layer for a space includes a global coordinate or a pose of an object, or information about an object recognized as an obstacle. The generic information layer for a space includes semantic information for the space or constituent elements of the space. The spatio-temporal information layer for a space includes a brightness of light, a direction of lighting, a temperature, and a humidity, which vary according to a temporal and spatial state of an indoor.

The actual measurement information layer for an object includes information of 2D/3D raw information that stores 2D or 3D representation data obtained by actually measuring an object. The topological information layer for an object includes information about accessible directions represented by a plurality of 3D contact points and 3D directional vectors. The spatio-temporal information layer for an object includes information about an object-space temporal dependency, an object presence and spatiotemporal dependency, an object-object spatiotemporal dependency relation, an object-function spatiotemporal dependency, and an object-physical feature spatiotemporal dependency. The reasoning information layer for an object includes information about an evidence structure formed as a graph representing relation between information of lower information layers as a probability.

The photometric feature includes information such as Scale Invariant Feature Transform (SIFT), Harris Corner, color, and line.

The obstacle information includes information represented as mesh or cell.

The 2D or 3D representation data includes at least one of: a 2D raw image calculated through at least two of camera angles; depth data obtained from one of a laser scanner, a stereo camera, and a structured light camera; and mesh data generated from the depth data.

In the step a), the spatial information or the object information is composed and stored in ontology. In the step e), reasoning is performed based on ontology.

In the step g), if requested information includes information about a base map of the actual measurement information layer for a space and object/obstacle location information of the topological information layer, the interface generates a united map by combining the information about the base map and the object/obstacle location information and provides the united map to the robot.

The method further includes the steps of: a0) composing a probability based behavior structure based on a given mission, which decides unit behaviors to perform by a robot, and storing the composed probability based behavior structure before the step a); and d) returning the probability based behavior structure in response to a searching request of the robot or extracting unit behaviors to perform and necessary information to perform the unit behavior by analyzing the given mission and returning the extracted unit behaviors and the extracted necessary information after the step c).

In the step a0), the behavior structure is composed in a Bayesian network having a probabilistic precedence relation of perception data, an evidence structure and behaviors. In the step d), an optimal path is decided based on a probability of the precedence relation and behaviors on the selected path are extracted as unit behaviors to perform.

Also, the present invention relates to a computer readable recording medium for storing a method for processing information for service robots using a central information processing system communicating with at least one of mobile service robots in an indoor.

Please, refer description of the central information processing system according to the present invention to learn more about the central information processing method for the service robot according to the present invention.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

The central information processing system and method according to the present invention can be applied to a field for sharing and providing necessary information to mobile service robots in an indoor space. Particularly, the central information processing system and method according to the present invention can be applied even though a plurality of robots simultaneously operate in the same indoor space.

The central information processing system and method according to the present invention integrally manage necessary information to enable mobile service robots to share. Therefore, the central information processing system and method according to the present invention improves data management efficiency and reduces a spatial cost for storing knowledge in a plurality of robots and a temporal cost for learning about a space and objects.

The central information processing system and method according to the present invention also provide information based on a recognition/reasoning level of each mobile service robot. Therefore, information can be integrally managed and robots can share information although robots having different recognition/reasoning levels simultaneously operate in the same indoor environment.

Furthermore, the central information processing system and method according to the present invention provide information reasoned at high level to service robots having a low recognition/reasoning level. Therefore, a user may be able to receive a high level service corresponding to a high cost mobile service robot using a low cost mobile service robot.

What is claimed is:

1. A central information processing system communicating with a plurality of mobile service robots in an indoor, the central information processing system comprising:

a broker unit including a plurality of interfaces respectively corresponding to the service robots where each of the interfaces analyzes an information request from a corresponding service robot, transforms a format of the requested information to a format analyzable by the corresponding service robot, and transmits the transformed information to the service robot;

a spatial information manager for hierarchically composing and storing spatial information for the indoor according to a recognition/reasoning level, searching spatial information requested by a spatial information request of the broker unit, and returning the searched spatial information, the spatial information being shared by the plurality of mobile service robots, the spatial information including a plurality of information layers, each layer having a different recognition/reasoning level;

an object information manager for hierarchically composing and storing object information about objects in the indoor according to a recognition/reasoning level, searching object information requested by an object information request of the broker unit, and returning the searched object information, the object information being shared by the plurality of mobile service robots, the object information including a plurality of information layers, each layer having a different recognition/reasoning level; and a space and object reasoning unit for searching and reasoning upper layer information about the object or space using lower layer information obtained from real environment or object, or searching and reasoning lower layer information to be used for comprehension of the object or space from upper layer information, wherein:

the plurality of mobile service robots include a first robot having a first level of recognition/reasoning and a second robot having a second level of recognition/reasoning that is different from the first level;

the broker unit includes a first interface that transmits, upon request from the first robot, information that corresponds to the first level of recognition/reasoning to the first robot, and a second interface that transmits, upon request from the second robot, information that corresponds to the second level of recognition/reasoning to the second robot;

the spatial information or the object information stored in the central information processing system includes a spatio-temporal information layer including information about variation and relation of objects or a space according to a time and a space; and the spatial information manager or the object information manager composes and stores the spatial information or the object information in ontology, and the space and object reasoning unit performs reasoning based on ontology.

2. The central information processing system of claim 1, wherein the spatial information or the object information stored in the central information processing system includes:

an actual measurement information layer including actual measurement information;

a photometric information layer including photometric features;

a geometric information layer including information about sub-parts obtained by dividing an object or a space by a geometric structure;

a structural information layer including information obtained by dividing constituent elements of a space or an object and symbolizing and layering information about the divided constituent elements;

a topological information layer including information for representing locations of objects and obstacles in a space and accessibility information for gripping an object;

a generic information layer including information about generic models of a space, an object, and constituent elements of the space and the object; and a reasoning information layer including reasoning information for reasoning about a space, an object or states of the space or the object from object or spatial information of lower information layers.

3. The central information processing system of claim 2, wherein the actual measurement information layer for a space includes base map information having geometric information of an indoor space, the photometric information layer for a space includes a photometric feature map of an indoor space, the geometric information layer for a space includes geometric information of sub-parts obtained by dividing an indoor space geometrically, the topological information layer for a space includes a global coordinate or a pose of an object, or information about an object recognized as an obstacle, the generic information layer for a space includes semantic information for the space or constituent elements of the space, and the spatio-temporal information layer for a space includes a brightness of light, a direction of lighting, a temperature, and a humidity, which vary according to a temporal and spatial state of an indoor.

4. The central information processing system of claim 3, wherein the actual measurement information layer for an object includes information of 2D/3D raw information that stores 2D or 3D representation data obtained by actually measuring an object, the topological information layer for an object includes information about accessible directions represented by a plurality of 3D contact points and 3D directional vectors, the spatio-temporal information layer for an object includes information about an object-space temporal dependency representing how a location of an object changes in a time domain, an object presence and spatiotemporal dependency representing influence to existence of the other objects when a specific object is in a specific temporal space, an object-object spatiotemporal dependency representing how an object is influenced by existence of the other object, an object-function spatiotemporal dependency representing how a function of an object changes according to a time and a space, and an object-physical feature spatiotemporal dependency representing what features of an object are changed according to a time and a space, and the reasoning information layer for an object includes information about an evidence structure formed as a graph representing relation between information of lower information layers as a probability.

5. The central information processing system of claim 4, wherein the photometric feature includes Scale Invariant Feature Transform (SIFT), Harris Corner, color, and line.

6. The central information processing system of claim 3, wherein the obstacle information includes information represented as mesh or cell.

7. The central information processing system of claim 4, wherein the 2D or 3D representation data includes at least one of:

a 2D raw image calculated through at least two of camera angles; depth data obtained from one of a laser scanner, a stereo camera, a structured light camera; and mesh data generated from the depth data.

8. The central information processing system of claim 4, wherein the interface composes a united map by combining information about a base map of the actual measurement information layer for a space and object/obstacle location information of the topological information layer and provides the united map to the service robot, if the corresponding service robot requests a map.

9. The central information processing system of claim 1, further comprising a mission analysis manager for composing a probability based behavior structure based on a given mission, which decides unit behaviors to perform by a robot, and storing the composed probability based behavior structure, returning the probability based behavior structure in response to a request from the broker unit or extracting unit behavior to perform and necessary information by analyzing the given mission and returning the extracted unit behavior and the extracted necessary information.

10. The central information processing system of claim 9, wherein the mission analysis manager composes the behavior structure in a Bayesian network having a probabilistic precedence relation of perception data, an evidence structure behaviors, and decides an optimal path based on a probability of the precedence relation and extract behaviors on the selected path as unit behaviors to perform.

11. A method for processing information for service robots using a central information processing system communicating with a plurality of mobile service robots in an indoor, comprising the steps of:
 a) hierarchically composing and storing spatial information and object information for the indoor according to a recognition/reasoning level;
 b) composing interface for each service robot, analyzing an information request of the service robot, transforming a format of the requested information to a format analyzable by the service robot, and transmitting the transformed information to the robot;
 c) receiving an information searching request for searching a spatial information or an object information from the robot;
 e) determining whether reasoning is required for searching information or not, and searching and reasoning upper layer information about the object or space using lower layer information obtained from real environment or object, or searching and reasoning lower layer information to be used for comprehension of the object or space from upper layer information;
 f) searching requested object information or requested spatial information; and
 g) transmitting searched spatial information or searched object information to the requesting robot,
wherein:
the plurality of mobile service robots include a first robot having a first level of recognition/reasoning and a second robot having a second level of recognition/reasoning that is different from the first level;
upon request from the first robot, an information that corresponds to the first level of recognition/reasoning is transmitted, and, upon request from the second robot, an information that corresponds to the second level of recognition/reasoning is transmitted;
the spatial information or the object information includes a spatio-temporal information layer including information about variation and relation of objects or a space according to a time and a space; and
in the step a), the spatial information or the object information is composed and stored in ontology, and in the step e), reasoning is performed based on ontology.

12. The method of claim 11, wherein the spatial information or the object information includes:
 an actual measurement information layer including actual measurement information;
 a photometric information layer including photometric features;
 a geometric information layer including information about sub-parts obtained by dividing an object or a space by a geometric structure;
 a structural information layer including information obtained by dividing constituent elements of a space or an object and symbolizing and layering information about the divided constituent elements;
 a topological information layer including information for representing locations of objects or obstacles in a space;
 a generic information layer including information about generic models of a space, an object, or constituent elements of the space or the object;
 a reasoning information layer including reasoning information for reasoning about a space, an object or states of the space and the object from object or spatial information of lower information layers.

13. The method of claim 12, wherein the actual measurement information layer for a space includes base map information having geometric information of an indoor space,
 the photometric information layer for a space includes a photometric feature map of an indoor space,
 the geometric information layer for a space includes geometric information of sub-parts obtained by dividing an indoor space geometrically,
 the topological information layer for a space includes a global coordinate or a pose of an object, or information about an object recognized as an obstacle,
 the generic information layer for a space includes semantic information for the space or constituent elements of the space, and
 the spatio-temporal information layer for a space includes a brightness of light, a direction of lighting, a temperature, and a humidity, which vary according to a temporal and spatial state of an indoor.

14. The method of claim 12, wherein the actual measurement information layer for an object includes information of 2D/3D raw information that stores 2D or 3D representation data obtained by actually measuring an object,
 the topological information layer for an object includes information about accessible directions represented by a plurality of 3D contact points and 3D directional vectors,
 the spatio-temporal information layer for an object includes information about an object-space temporal dependency representing how a location of an object changes in a time domain, an object presence and spatiotemporal dependency representing influence to existence of the other objects when a specific object is in a specific temporal space, an object-object spatiotemporal dependency representing how an object is influenced by existence of the other object, an object-function spatiotemporal dependency representing how a function of an object changes according to a time and a space, and an object-physical feature spatiotemporal dependency representing what features of an object are changed according to a time and a space, and
 the reasoning information layer for an object includes information about an evidence structure formed as a graph representing relation between information of lower information layers as a probability.

15. The method of claim 12, wherein the photometric feature includes Scale Invariant Feature Transform (SIFT), Harris Corner, color, and line.

16. The method of claim 12, wherein the obstacle information includes information represented as mesh or cell.

17. The method of claim 14, wherein the 2D or 3D representation data includes at least one of:
 a 2D raw image calculated through at least two of camera angles;
 depth data obtained from one of a laser scanner, a stereo camera and a structured light camera;
 mesh data generated from the depth data.

18. The method of claim 12, wherein in the step g), if requested information includes information about a base map of the actual measurement information layer for a space and object/obstacle location information of the topological information layer, a united map is composed by combining the information about the base map and the object/obstacle location information.

19. The method of claim 11, further comprising the steps of:
- a0) composing a probability based behavior structure based on a given mission, which decides unit behaviors to perform by a robot, and storing the composed probability based behavior structure before the step a); and
- d) returning the behavior structure in response to a searching request of the robot or extracting unit behaviors to perform and necessary information to perform the unit behavior by analyzing the given mission and returning the extracted unit behaviors and the extracted necessary information after the step c).

20. The method of claim 19, wherein in the step a0), the behavior structure is composed in a Bayesian network having a probabilistic precedence relation of perception data, an evidence structure and behaviors, and
- in the step d), an optimal path is decided based on a probability of the precedence relation and behaviors on the selected path are extracted as unit behaviors to perform.

21. A computer readable recording medium for storing a method for processing information for service robots using a central information processing system communicating with a plurality of mobile service robots in an indoor, the method comprising:
- a) hierarchically composing and storing spatial information and object information for the indoor according to a recognition/reasoning level;
- b) composing interface for each service robot, analyzing an information request of the service robot, transforming a format of the requested information to a format analyzable by the service robot, and transmitting the transformed information to the robot;
- c) receiving an information searching request for searching a spatial information or an object information from the robot;
- e) determining whether reasoning is required for searching information or not, and searching and reasoning upper layer information about the object or space using lower layer information obtained from real environment or object, or searching and reasoning lower layer information to be used for comprehension of the object or space from upper layer information;
- f) searching requested object information or requested spatial information; and
- g) transmitting searched spatial information or searched object information to the requesting robot, wherein:

the plurality of mobile service robots include a first robot having a first level of recognition/reasoning and a second robot having a second level of recognition/reasoning that is different from the first level;

upon request from the first robot, an information that corresponds to the first level of recognition/reasoning is transmitted, and, upon request from the second robot, an information that corresponds to the second level of recognition/reasoning is transmitted;

the spatial information or the object information includes a spatio-temporal information layer including information about variation and relation of objects or a space according to a time and a space; and in the step a), the spatial information or the object information is composed and stored in ontology, and in the step e), reasoning is performed based on ontology.

* * * * *